(12) United States Patent
Sumi

(10) Patent No.: US 10,232,598 B2
(45) Date of Patent: Mar. 19, 2019

(54) SKINNED PANEL AND METHOD OF MOLDING THEREOF

(75) Inventor: Takehiko Sumi, Kanagawa (JP)

(73) Assignee: KYORAKU CO., LTD., Kamigyo-ku, Kyoto (JP)

( * ) Notice: Subject to any disclaimer, the term of this patent is extended or adjusted under 35 U.S.C. 154(b) by 0 days.

(21) Appl. No.: 12/827,374

(22) Filed: Jun. 30, 2010

(65) Prior Publication Data

US 2011/0262736 A1 Oct. 27, 2011

(30) Foreign Application Priority Data

Apr. 21, 2010 (JP) .................................. 2010-097780

(51) Int. Cl.
*B29C 51/12* (2006.01)
*B32B 37/15* (2006.01)
(Continued)

(52) U.S. Cl.
CPC ............ *B32B 37/153* (2013.01); *B29C 44/22* (2013.01); *B29C 47/0021* (2013.01);
(Continued)

(58) Field of Classification Search
CPC ..... B29C 51/267; B29C 51/36; B29C 51/365; B29C 51/38; B29C 51/105; B29C 51/12; B29C 47/0042; B29C 47/065
USPC ......... 156/244.12, 244.21, 244.27, 514, 515, 156/516; 264/46.8, 545, 45.9, 514, 515, 264/516

See application file for complete search history.

(56) References Cited

U.S. PATENT DOCUMENTS 4,889,669 A * 12/1989 Suzuki ......................... 264/45.9
5,080,742 A * 1/1992 Takahashi ............... B29C 51/12
156/212

(Continued)

FOREIGN PATENT DOCUMENTS

CN 1575952 A 2/2005
EP 1057608 A2 12/2000
(Continued)

OTHER PUBLICATIONS

Koenhen, D.M., and C.A. Smolders, "The Determination of Solubility Parameters of Solvents and Polymers by Means of Correlations with Other Physical Quantities", Journal of Applied Polymer Science, vol. 19, pp. 1163-1179, 1975.*

(Continued)

*Primary Examiner* — William P Bell
(74) *Attorney, Agent, or Firm* — Maier & Maier, PLLC

(57) ABSTRACT

A skinned panel for stably molding a thin skin material and a molding method thereof. An extruding device is configured to extrude a pair of multilayered resin sheets, each of which has a lamination structure of an inner layer made of a foamed resin and an outer layer made of a non-foamed resin that is changed into a skin material of a sandwich panel as a skinned panel. The pair of the resin sheets is abutted to the circumferential part of the pair of the split molds for producing sealed spaces. The sealed spaces are sucked for pressing the pair of the resin sheets onto cavities of the pair of the split molds. Accordingly, the pair of the resin sheets is formed in a shape substantially identical to the outline of the sandwich panel.

1 Claim, 15 Drawing Sheets

(51) Int. Cl.
  *B29C 49/00* (2006.01)
  *B29C 49/20* (2006.01)
  *B29C 51/14* (2006.01)
  *B29C 51/10* (2006.01)
  *B29C 44/22* (2006.01)
  *B29C 47/00* (2006.01)
  *B29C 47/06* (2006.01)
  *B29C 47/08* (2006.01)
  *B29C 47/14* (2006.01)
  *B32B 5/18* (2006.01)
  *B32B 27/06* (2006.01)
  *B32B 7/04* (2019.01)
  *B32B 27/30* (2006.01)
  *B32B 27/32* (2006.01)
  *B32B 27/34* (2006.01)
  *B32B 38/12* (2006.01)

(52) U.S. Cl.
  CPC ...... *B29C 47/0042* (2013.01); *B29C 47/0064* (2013.01); *B29C 47/065* (2013.01); *B29C 47/0816* (2013.01); *B29C 47/145* (2013.01); *B29C 49/0047* (2013.01); *B29C 49/20* (2013.01); *B29C 51/105* (2013.01); *B29C 51/12* (2013.01); *B29C 51/14* (2013.01); *B32B 5/18* (2013.01); *B32B 7/04* (2013.01); *B32B 27/065* (2013.01); *B32B 27/302* (2013.01); *B32B 27/304* (2013.01); *B32B 27/308* (2013.01); *B32B 27/32* (2013.01); *B32B 27/34* (2013.01); *B29C 2049/0057* (2013.01); *B32B 38/12* (2013.01); *B32B 2262/10* (2013.01); *B32B 2262/101* (2013.01); *B32B 2262/106* (2013.01); *B32B 2266/025* (2013.01); *B32B 2266/0228* (2013.01); *B32B 2305/022* (2013.01); *B32B 2307/732* (2013.01); *B32B 2309/105* (2013.01); *B32B 2309/14* (2013.01); *B32B 2419/00* (2013.01); *B32B 2457/00* (2013.01); *B32B 2509/00* (2013.01); *B32B 2605/08* (2013.01); *B32B 2605/18* (2013.01); *B32B 2607/00* (2013.01); *Y10T 428/249953* (2015.04); *Y10T 428/249981* (2015.04)

(56) References Cited

U.S. PATENT DOCUMENTS

| | | | |
|---|---|---|---|
| 5,116,881 A * | 5/1992 | Park et al. | 521/143 |
| 7,169,338 B2 * | 1/2007 | Imanari et al. | 264/45.9 |
| 7,311,216 B2 * | 12/2007 | Donnelly et al. | 220/1.5 |
| 2002/0081346 A1 * | 6/2002 | Ekendahl | B29C 51/12 425/383 |
| 2003/0216503 A1 * | 11/2003 | Merfeld | 524/508 |
| 2005/0058824 A1 * | 3/2005 | Fujimoto | 428/316.6 |
| 2006/0099289 A1 * | 5/2006 | Fukumura | B29C 44/22 425/191 |
| 2008/0258329 A1 * | 10/2008 | Polk | B29C 47/0811 264/101 |
| 2009/0092821 A1 * | 4/2009 | Dharan | 428/314.4 |
| 2011/0008565 A1 | 1/2011 | Kodama et al. | |
| 2011/0135862 A1 * | 6/2011 | Sumi et al. | 428/36.91 |
| 2012/0205038 A1 * | 8/2012 | Sumi | B29C 51/10 156/244.11 |

FOREIGN PATENT DOCUMENTS

| | | | |
|---|---|---|---|
| JP | 2000-334759 A | | 12/2000 |
| JP | 2001-315237 A | | 11/2001 |
| JP | 2003071912 A | * | 3/2003 |
| JP | 2009-143189 A | | 7/2009 |
| JP | 2009-160972 A | | 7/2009 |
| WO | WO2009/136489 | | 11/2009 |

OTHER PUBLICATIONS

Machine translation of Japanese Patent Publication No. JP-2003071912A, originally published Mar. 2003, 6 pages.*
Japanese Office Action of the corresponding Japanese Application No. 2010-097780, dated May 27, 2014.
Chinese Office Action of the corresponding Chinese Application No. 201010214906.5, dated Jun. 3, 2014.

* cited by examiner

SKINNED PANEL AND METHOD OF MOLDING THEREOF

CROSS-REFERENCE TO RELATED APPLICATIONS

This application claims priority to Japanese Patent Application No. 2010-097780 filed on Apr. 21, 2010, the entirety of which is hereby incorporated by reference in its entirety.

BACKGROUND OF THE INVENTION

Field of the Invention

The present invention relates to a skinned panel whose core material is covered with a skin material sheet and a molding technology thereof.

Related Art

The skinned panels have been conventionally used for various objects or purposes including the transportation machines (e.g., automobiles and airplanes), the building materials, the housings of the electrical equipment, and sports and leisure activities. The skinned panels basically have a structure in which a core material is covered with single or plural skin material sheets, and are classified into the following types. One has a structure that only one side of the core material is covered with a skin material sheet. The other has a structure that both sides of the core material are covered with skin material sheets. For example, the skinned panels, having the structure that one side of the core material is covered with the skin material sheet, are used for objects such as the building materials. In the objects, that the other side of the core material is not required to be covered with the skin material sheet because the other side of the core material is not visible for a user. On the other hand, the skinned panels, having the structure that the both sides of the core material are covered with the skin material sheets, are also referred to as the sandwich panels. The sandwich panels are composed of two skin material sheets and a core material interposed therebetween. In other words, the sandwich panels are basically formed by a laminated structure of a skin material sheet, a core material, and a skin material sheet.

PCT Patent Application Publication No. WO2009/136489 discloses a method of molding a sandwich panel using a pair of split molds and a pair of molten resin sheets made of a thermoplastic resin material. In the molding method, molding of skin material sheets and welding of the skin material sheets and a core material are simultaneously achieved under a condition that the core material is interposed between a pair of the molten resin sheets extruded out of T-dies within the pair of split molds. Further, the publication discloses a method of molding a preferable core material and a method of molding a sandwich panel when a sandwich panel made of a resin is applied to a cargo floor lid of an automobile, for instance. In other words, the publication discloses a method of molding a sandwich panel and a method of molding a core material having a complex outline for accommodating the sandwich panel in a limited space within an automobile.

Now, specifications required for the skinned panels depend on purposes. For example, it is required for the skinned panels to achieve both reduction in weight and enhancement in stiffness when a sandwich panel made of a resin is used for the cargo floor lids of the automobiles as a skinned panel. The cargo floor lids are generally used for putting heavy loads thereon. Therefore, the cargo floor lids are required to have a stiffness (especially, a flexural stiffness) enough to endure the weight of the loads. Simultaneously, the cargo floor lids are required to have a light weight in terms of enhancement in fuel economy of the vehicles. According to the publication, reduction in weight and enhancement in stiffness, which are the required points, are both achieved by a relatively light core material with a hollowed part and skin material sheets having a stiffness greater than that of the core material.

The skinned panels have been recently requested to simultaneously ensure a high stiffness and achieve further reduction in weight for the cargo floor lids of the automobiles but also for other objects such as the bathtub covers. In response to the request, the inventor of the present application tried to form a skin material sheet thinner than the conventional one in order to achieve reduction in weight of a skinned panel. However, this turned out to be difficult because of the following reasons. First, a thin resin sheet cannot be sufficiently welded with the core material, because it is rapidly cooled down and solidified immediately after it is extruded. Second, the extruded resin sheet has a high chance of producing a so-called curtain phenomenon that the surface of the resin sheet is formed in a wavy shape, because it is thinly formed. When the curtain phenomenon is produced in the resin sheet, some portions of the resin sheet are welded before molding. A molding performance is thereby deteriorated within the split molds.

In view of the above, an aspect of the present invention addresses a need to provide a skinned panel for stably forming a thin skin material sheet and a molding method thereof.

SUMMARY OF THE INVENTION

A first aspect of the present invention provides a method of molding a skinned panel whose core material is covered with a skin material sheet.

The method of molding the skinned panel includes the steps of:

(A) Extruding a multilayered resin sheet formed by laminating an inner layer made of a foamed resin and an outer layer made of a non-foamed resin that is changed into the skin material sheet; and (B) Welding the core material with the inner layer of the resin sheet.

A second aspect of the present invention provides a skinned panel whose core material is covered with a skin material sheet.

The skinned panel includes:

(C) A first resin sheet made of a non-foamed resin, which functions as the skin material sheet;

(D) A second resin sheet made of a foamed resin, which is disposed inside of the first resin sheet and is molded when being extruded out of a multilayer die while being unitarily laminated with the first resin sheet; and (E) A core material welded with the second resin sheet.

BRIEF DESCRIPTION OF DRAWINGS

Referring now to the attached drawings which form a part of this original disclosure.

DETAILED DESCRIPTION OF THE EMBODIMENTS

First Exemplary Embodiment

The following description relates to a sandwich panel as a skinned panel according to a first exemplary embodiment of the present invention and a molding method thereof. It is to be understood that both the foregoing general description and the following detailed description are exemplary and explanatory and are not to limit the scope of the invention.

(1) Sandwich Panel

A sandwich panel 1 of the present exemplary embodiment will be hereinafter explained with reference to FIGS. 1 and 2.

Figure 1:
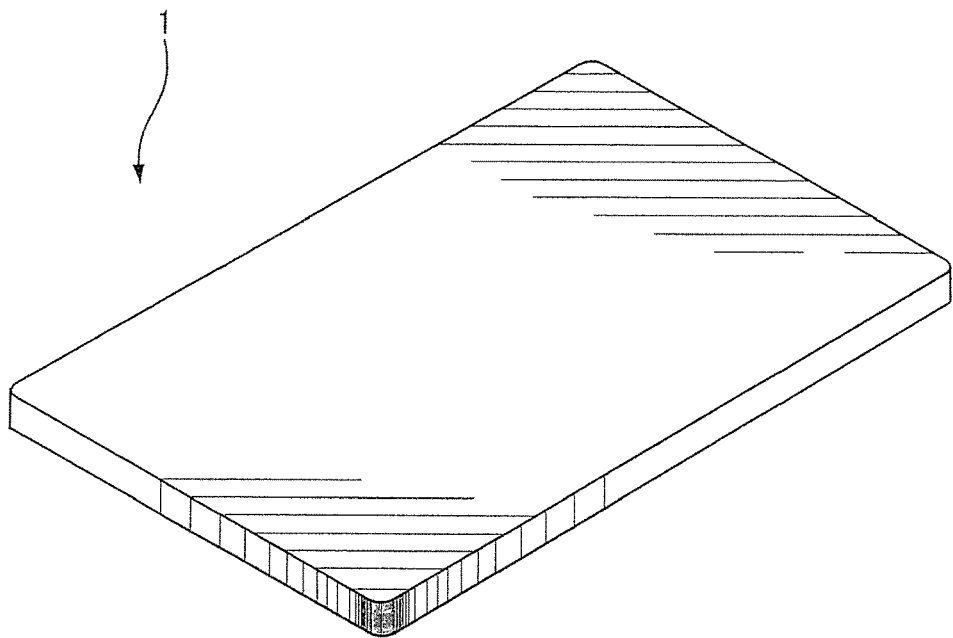
FIG. 1 is an entire perspective view of a sandwich panel according to a first exemplary embodiment.
Figure 2:
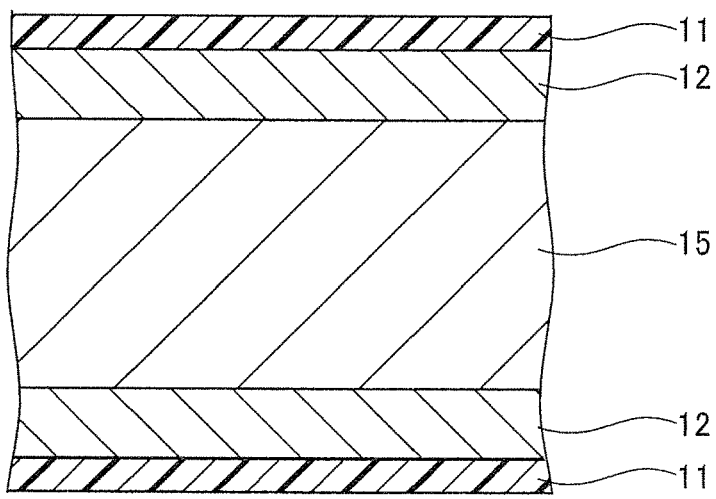
FIG. 2 is a cross-sectional view of the sandwich panel according to the first exemplary embodiment.

As illustrated in FIG. 1, the sandwich panel 1 of the present exemplary embodiment has, for example, a substantially rectangular-cuboid outline. As more clearly illustrated in a cross-sectional view of FIG. 2, the sandwich panel 1 is composed of a core material 15 and two pairs of first and second resin sheets 11, 12 made of a thermoplastic resin. The front and back sides of the sandwich panel 1 respectively include a pair of the first and second resin sheets 11, 12. The core material 15 is interposed between a pair of the first and second resin sheets 11, 12 disposed on the front side of the sandwich panel 1 and another pair of the first and second resin sheets 11, 12 disposed on the back side of the sandwich panel 1. With respect to each pair of the first and second resin sheets 11, 12, the second resin sheet 12 is disposed over the core material 15 whereas the first resin sheet 11 is disposed over the second resin sheet 12. Each pair of the first and second resin sheers 11, 12 thus forms a thin skin material sheet of the sandwich panel 1. In other words, the sandwich panel 1 is a laminated structure composed of a pair of the resin sheets 11, 12 disposed on the front side, the core material 15, and a pair of the resin sheets 11, 12 disposed on the back side.

In the sandwich panel 1 of the present exemplary embodiment, the first and second resin sheets 11, 12 are obtained by molding a multilayered resin sheet (a molten resin) within molds. The multilayered resin sheet is herein extruded by an extruding device under the condition that plural layers, composing the multilayered resin sheet, are laminated. A foamed/cellular resin layer (hereinafter referred to as "a foamed resin layer") is herein used as the second resin sheet 12, which is disposed as an inner layer to be welded with the core material 15 within the mold. On the other hand, a thin non-foamed/non-cellular resin layer (hereinafter referred to as "a non-foamed resin layer") is used as the first resin sheet 11, which is disposed as an outer layer corresponding to the skin material sheet of the sandwich panel 1.

In the sandwich panel 1 of the present exemplary embodiment, the core material 15 is molded using, for example, a thermoplastic resin. The resin material is not herein limited in particular, but includes a polyolefine material (e.g., polypropylene and polyethylene), an acrylic derivative material (e.g., polyamide, polystyrene and polyvinyl chloride), or a mixture containing two or more of a polyolefine material/materials and/or an acrylic derivative material/materials. The core material 15 occupies a large volume of the sandwich panel 1. Preferably, the core material 15 is made of a foamed resin expanded by a foaming agent for reducing its weight. Further, the core material 15 is preferably made of a foamed resin in terms of sufficient enhancement of its welding strength with the second resin sheet 12 made of a foamed resin. The foamed resin to be used for forming the core material 15 has an expansion ratio ranging 10-60, for instance, and representatively 30.

The expansion ratio is a value obtained by dividing density of pre-foamed mixed resin by an apparent density of a post-foamed mixed resin (i.e., a foamed resin).

Further, the core material 15 and the second resin sheets 12 are preferably made of materials having a high affinity to each other for further enhancing their welding strengths. For example, the core material 15 and the second resin sheets 12 preferably include an identical resin material. In this case, the core material 15 may be made of foamed polystyrene (PS), whereas the second resin sheets 12 may be made of material including foamed polystyrene. Alternatively, the core material 15 may be made of foamed polypropylene, whereas the second resin sheets 12 may be made of material including foamed polypropylene. The second resin sheets 12 have an expansion ratio ranging 1.5-15, and representatively 4 and preferably 2.5-10. A difference of the SP values of the core material 15 and the second resin sheets 12 is preferably 2.0 (cal/cm$^3$) or less, and more preferably, 0.5 (cal/cm$^3$) or less because a high affinity is produced between the core material 15 and the second resin sheets 12 and a welding strength is thereby further enhanced. It should be herein noted that "SP" stands for "solubility parameter" as a measurement of solubility. In this specification of the present application, the SP values are configured to be obtained by the FEDORS method.

It should be also noted that polypropylene has a SP value of about 8.1 (cal/cm$^3$) whereas polystyrene has a SP value of about 9.1 (cal/cm$^3$), for instance.

It should be noted that the core material 15 preferably has an expansion ratio different from that of the second resin sheets 12. In this case, it is possible to enhance a sound insulation performance (a sound absorption performance) with respect to sound to be inputted into the sandwich panel 1 in a wide range of frequency. In addition, it is possible to enhance a vibration absorption effect with respect to vibration to be inputted into the sandwich panel 1. The core material 15 further preferably has an expansion ratio greater than that of the second resin sheets 12. In this case, the sandwich panel 1 can ensure a sufficient stiffness against input force from external with the second resin sheets 12 of a low expansion ratio respectively disposed in the vicinity of the skin material sheets of the sandwich panel 1. Simultaneously, the sandwich panel 1 can reduce its entire weight with the core material 15 of a high expansion ratio occupying a large volume of the sandwich panel 1.

In the sandwich panel 1 of the present exemplary embodiment, a resin material, forming the first resin sheets 11 as the outer layers, is not limited in particular. However, the first resin sheets 11 are made of a non-foamed resin for ensuring the stiffness of the sandwich panel 1. Further, the first and second resin sheets 11, 12 are extruded in a laminated condition by the extruding device configured to unitarily extrude plural layers of the sandwich panel 1. Therefore, the second resin sheets 12 are preferably made of resin material including a component or components identical to that or those included in resin material of the first resin sheets 11 in terms of recycling. The second resin sheets 12 are made of a foamed resin while a foaming agent and/or a forming core material may remain therein. However, the first and second resin sheets 11, 12 preferably include the identical components excluding the residual components (i.e., the foaming agent and the foaming core material). In further considering a molding performance, both of the first and second resin sheets 11, are made of, for instance, a mixture in which polystyrene (PS) and polystyrene-block-polybutadiene-block-polystyrene (SEBS) are mixed into polypropylene (PP) as a main material. It should be noted that SEBS is mixed into PP for enhancing compatibility between PP and PS. For example, both of the first and second resin sheets 11, 12 include a material in which PS with a weight percent of 20-33 and SEBS with a weight percent of 5-7 are mixed into PP with a weight percent of 60-75. In forming both of the first and second resin sheets 11, 12 with the aforementioned mixture material, the affinity of the core material 15 and the second resin sheets 12 is enhanced when the core material 15 is made of a foamed resin of PP or PS. The welding strength between the core material 15 and the second resin sheets 12 is consequently enhanced as described above.

The first resin sheets 11 as the outer layers may be molded using a resin material into which a glass filler is mixed for increasing its stiffness and strength.

The glass filler herein includes for instance: glass fiber; glass fiber fabric (e.g., glass fiber cloth and glass non-woven fabric); glass bead; glass flake; glass powder; and milled glass. The glass herein includes, for example, glass of the following types: E-type glass; C-type glass; A-type glass; S-type glass; D-type glass; NE-type glass; T-type glass; quartz; low-dielectric glass; and high-dielectric glass.

It should be noted that glass filler is not necessarily mixed into the resin material and any other suitable materials may be mixed for enhancing the stiffness of the first resin sheets 11 as follows: talc; calcium carbonate; wollastonite; an inorganic filler (e.g., a magnesium series material); and a carbon fiber.

A thickness of the core material 15 is appropriately determined in accordance with a target thickness of the sandwich panel 1 and further thicknesses of resin sheets for ensuring a target stiffness of the sandwich panel 1. Therefore, the thickness of the core material 15 is not limited in particular. In the present exemplary embodiment, the thickness of the core material 15 is set to be substantially 10 mm, for instance. Further, the first resin sheets 11 as the outer layers preferably have a thickness ranging 0.1-0.6 mm and representatively have a thickness of 0.5 mm. In other words, the first resin sheets 11 can ensure a stiffness required for the cargo floor lid of the automobiles and the like when having a thickness greater than or equal to 0.1 mm. Further, when the first resin sheets 11 have a thickness less than or equal to 0.6 mm, this contributes to its weight reduction. On the other hand, the second resin sheets 12 as the inner layers are made of a foamed resin and accordingly less contribute to the stiffness of the sandwich panel 1. The second resin sheets 12 are not therefore required to have a particular thickness in terms of stiffness. However, each pair of the first and second resin sheets 11, 12 preferably has a total thickness, for instance, greater than or equal to 1.0 mm for preventing the first and second resin sheets 11, 12 from being rapidly cooled down and solidified immediately after being extruded out of the extruding device in a unitarily laminated state. For example, the second resin sheets 12 are set to have a thickness of 1.0 mm.

In the sandwich panel 1 of the present exemplary embodiment, a heretofore known physical foaming agent, a chemical foaming agent and a mixture thereof can be used as the foaming agent for the core material 15 and the second resin sheets 12. For example, an inorganic series physical foaming agent (e.g., air, carbon dioxide, and nitrogen gas) and an organic series physical foaming agent (e.g., butane, pentane, hexane, dichloromethane, and dichloroethane) may be herein used as the physical foaming agent. On the other hand, an organic foaming agent and an inorganic foaming agent may be used as the chemical foaming agent. The organic foaming agent may be one selected from the group consisting azodicarbonamide (ADCA), N,N'-dinitrosopentamethylenetetramine, 4,4'-oxybis (benzenesulfonylhydrazide), diphenylsulfone-3,3'-disulfonylhydrazide, p-toluenesulfonyl semicarbazide, trihydradinotriazine, azobisisobutyronitrile, and the like. On the other hand, the inorganic foaming agent may be a mixture of a polycarboxylic acid and an inorganic carbon compound or a salt of a polycarboxylic acid. The polycarboxylic acid may be one selected from the group consisting a citric acid, an oxalic acid, a fumaric acid, a phthalic acid, a malic acid, a tartaric acid, a cyclohexane-1,2-dicarboxylic acid, a camphoric acid, an ethylenediaminetetraacetic acid, a triethylene tetramine hexaacetic acid, a nitrilo acid, and the like. The inorganic carbon compound may be selected one from the group of sodium hydrogencarbonate, aluminum sodium hydrogencarbonate, potassium hydrogencarbonate, ammonium hydrogencarbonate, ammonium carbonate, and the like. The salt of the polycarboxylic acid may be selected one from the group consisting sodium dihydrogen citrate, potassium oxalate, and the like.

(2) Method of Molding Sandwich Panel

Next, a device for and a method of molding the sandwich panel 1 of the present exemplary embodiment using molds will be hereinafter explained with reference to FIGS. 3 to 9.

First, a molding apparatus for molding the sandwich panel 1 of the present exemplary embodiment will be explained.

Figure 3:
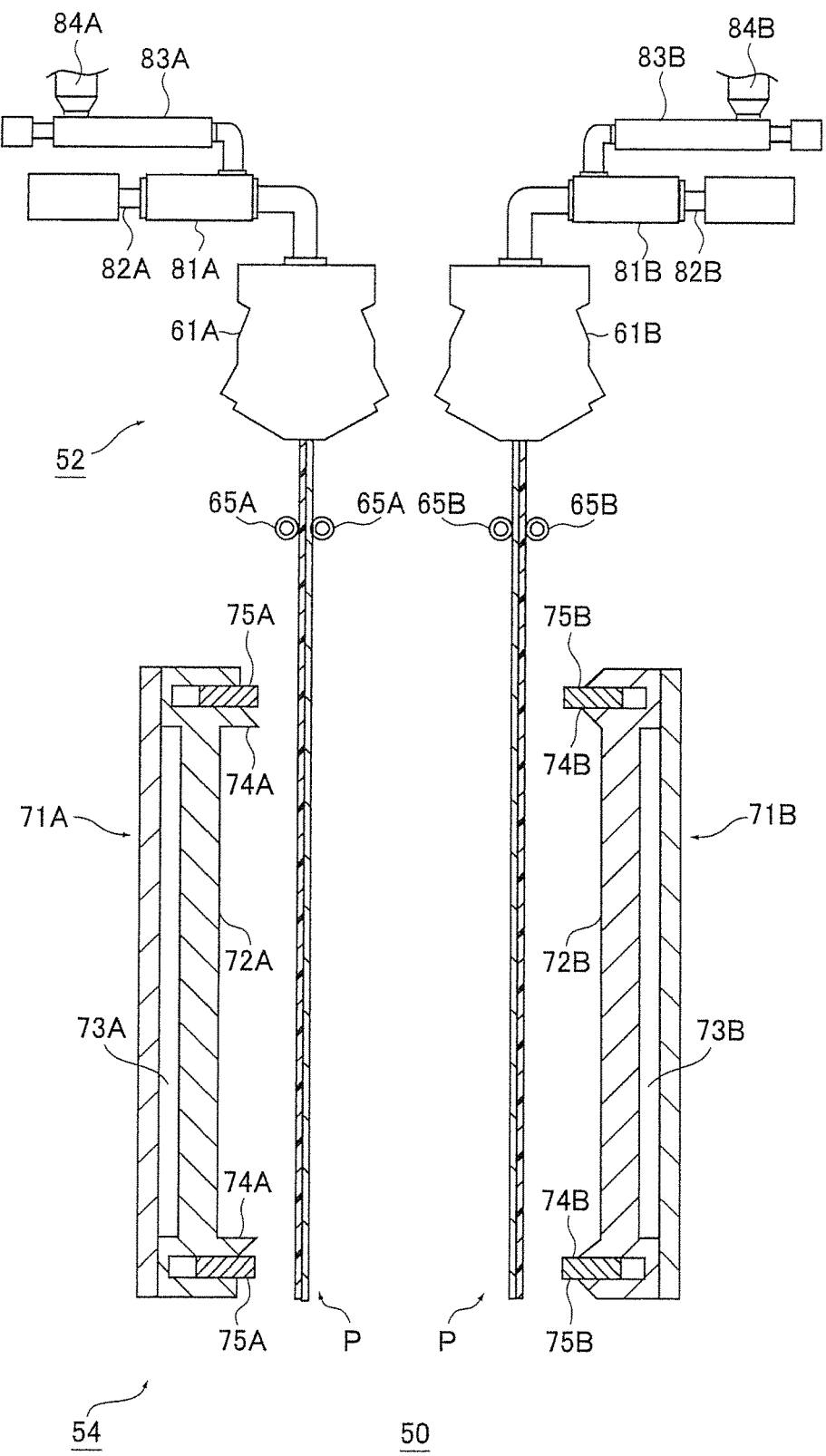
FIG. 3 is an entire configuration diagram of a molding apparatus for a sandwich panel according to the first exemplary embodiment.

As illustrated in FIG. 3, a molding apparatus 50 of the present exemplary embodiment includes an extruding device 52 and a mold clamping device 54 disposed below the extruding device 52. Resin sheets P are extruded out of the extruding device 52 in a molten state. The extruded resin sheets P in a molten state are subsequently conveyed to and molded in the mold clamping device 54. It should be noted that only the mold clamping device 54 and the resin sheets P in a molten state are illustrated in a cross-sectional view in FIG. 3.

The extruding device 52 includes T-dies 61A, 61B, accumulators 81A, 81B, plungers 82A, 82B, extruders 83A, 83B, and resin supply hoppers 84A, 84B. It should be noted that each of the T-dies is a T-die for plural layers (i.e., a multilayer die). Materials forming the plural layers are respectively configured to be supplied to the corresponding T-dies in an identical fashion. FIG. 3 thereby illustrates only a set of components correspondingly used for a layer (i.e., an accumulator, a plunger, an extruder, and a resin supply hopper) with respect to each T-die for the sake of convenience.

Figure 4:
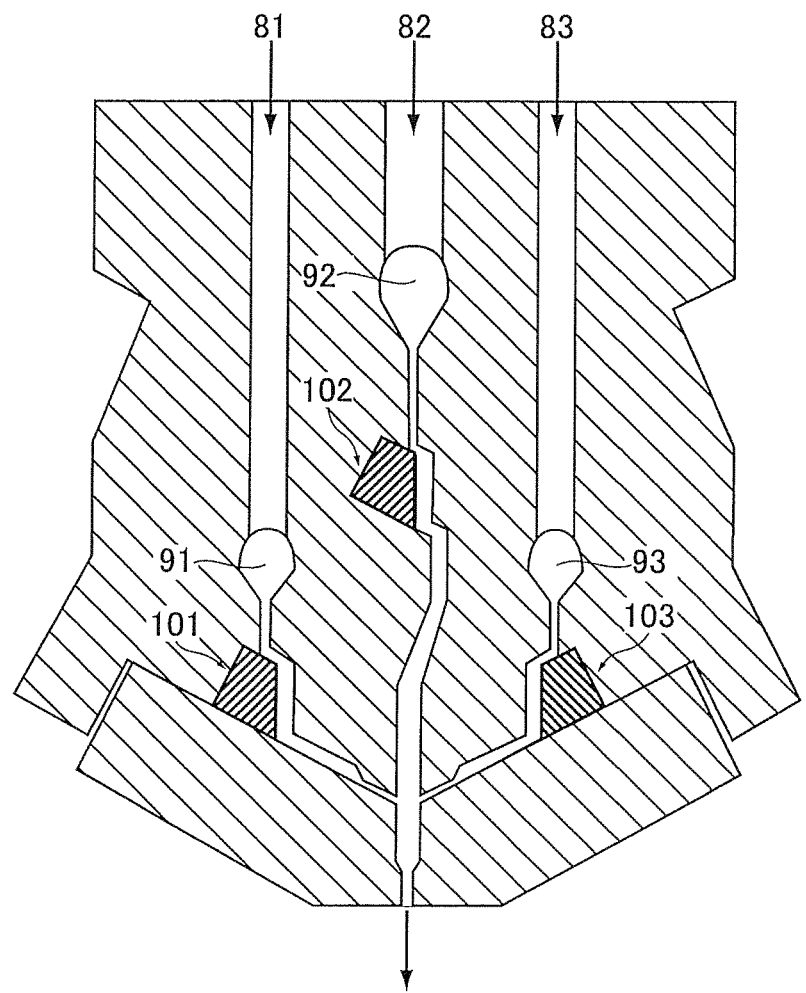
FIG. 4 is a cross-sectional view of a T-die according to the first exemplary embodiment, illustrating an exemplary configuration of the T-die (for a triple-layered resin sheet structure)

The extruding device 52 adopts a co-extrusion method. In the co-extrusion method, resin materials, respectively corresponding to the plural layers, are plasticized and molten using plural extruders, and the molten resins are unitarily laminated within and extruded out of the T-dies 61A, 61B. Further, the multi-manifold method and the field block method are known as methods of producing a multilayered resin sheet in each T-die using the co-extrusion method. In the present exemplary embodiment, it is allowed to use either of the multi-manifold method and the field block method. FIG. 4 illustrates a cross-sectional structural view of the T-dies 61A, 61B adopting the multi-manifold method as an example. In the example illustrated in FIG. 4, plural types of molten resins (three types in the example of FIG. 4) are respectively introduced into and guided along flow paths 81-83. The molten resins are subsequently expanded in the width direction of the T-die while flowing through manifolds 91-93, respectively. Choke bars 101-103, corresponding to the respective molten resins, are disposed in the downstream of the respective manifolds. Each of the choke bars 101-103 is configured to regulate the width directional flow amount and the thickness of each molten resin. Subsequently, the molten resins are joined and laminated in a position closer to the die tip of the T-die and are finally extruded out of the T-die. It should be noted that another choke bar may be further provided in the downstream of the joining position of the molten resin. In this case, the choke bar may be further configured to regulate the width directional flow amount of the molten resins in a laminated state. As described above, it is possible to separately regulate the width directional flow amounts of the molten resins in the multi-manifold method.

Therefore, the multi-manifold method is suitable for laminating molten resins having different flow properties.

Figure 5:
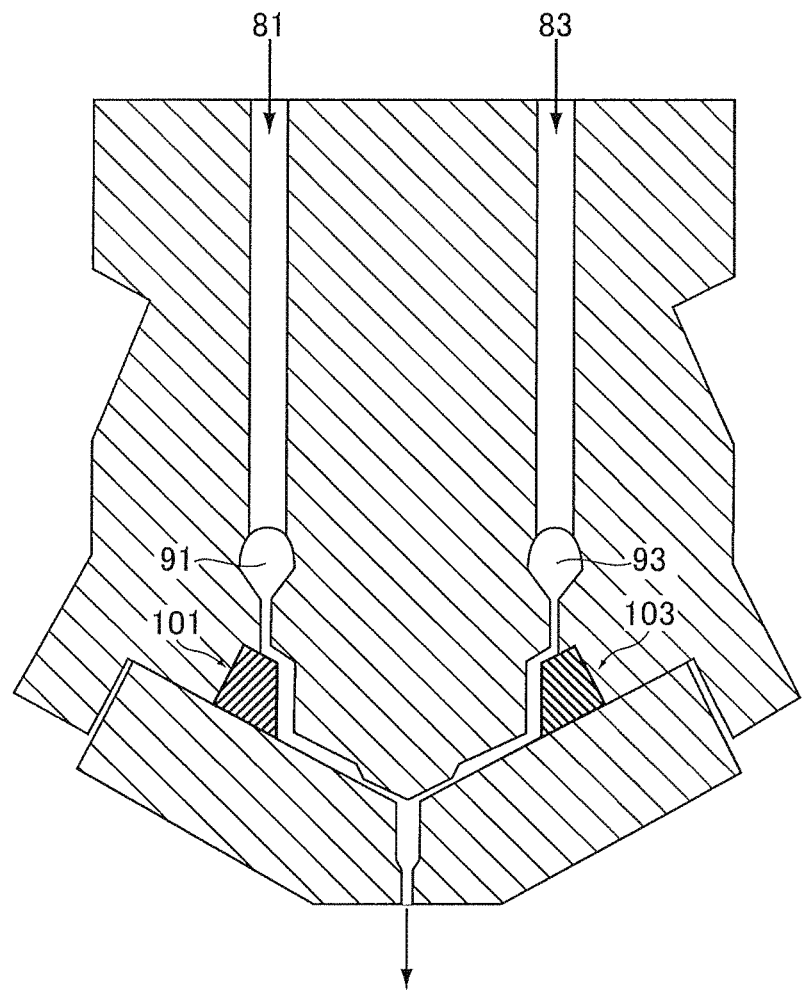
FIG. 5 is a cross-sectional view of the T-die according to the first exemplary embodiment, illustrating an exemplary configuration of the T-die (for a double-layered resin sheet structure)

Further, FIG. 5 illustrates a cross-sectional structural view of the T-dies 61A, 61B adopting the multi-manifold method as another example. The T-die illustrated in FIG. 4 is used for a triple-layered resin sheet structure but the T-die illustrated in FIG. 5 is used for a double-layered resin sheet structure. The double-layer T-die illustrated in FIG. 5 is different from the triple-layer T-die illustrated in FIG. 4 in that the double-layered T-die is not required to include the flow path 82, the manifold 92 and the choke bar 102.

On the other hand, a T-die adopting the field block method is not illustrated in the figure. However, a rough sketch of the extrusion method is as follows. The die adopting the field block method is provided with only a manifold. Further, a filed block is disposed in the entrance of the die center. The field block has a width significantly less than that of the die. The molten resins are joined and laminated within the block. The laminated molten resins are introduced into the die, flow through the single manifold, and are extended in the width direction of the die. The width directional flow amount and the thickness of the laminated molten resins are regulated by a choke bar disposed in the downstream of the manifold. The laminated molten resins are extruded out of the die in the downstream of the choke bar.

The following description relates to a case that the double-layer T-die illustrated in FIG. 5 is used as the T-dies 61A, 61B of the extruding device 52 of the present exemplary embodiment.

In the extruding device 52, extrusion performances of the extruders 83A, 83B can be appropriately chosen in accordance with the size of the sandwich panel 1. The extrusion performances of the extruders 83A, 83B are preferably set to be greater than or equal to 50 kg/h in terms of reduction of a molding cycle of the sandwich panel 1.

In the extruding device 52, an extrusion speed of each resin sheet is set by the T-die 61A (61B) and the accumulator 81A (81B). Further, an extrusion processing of each resin sheet is preferably completed in the T-die 61A (61B) within 40 seconds in terms of drawdown prevention. The processing is further preferably completed within 30 seconds. Therefore, the molten resin material, accumulated within the accumulator 81A (81B), is configured to be extruded out of the T-die 61A (61B) at a speed of greater than or equal to 50 kg/h per 1 $cm^2$, preferably at a speed of greater than or equal to 60 kg/h per 1 $cm^2$. In this case, drawdown impact can be further inhibited by changing a slit formed in the die tip of the T-die 61A (61B) in accordance with the extrusion speed of each resin sheet. In other words, it is possible to inhibit change in a thickness of each resin sheet due to its own weight, and it is also possible to uniformly form the thickness of a wide range of each resin sheet in a vertical direction by gradually expanding an interval of the slit of the T-die 61A (61B) from the beginning of the extrusion processing and then maximizing it at the end of the extrusion processing. It is thereby possible to uniformly form the thickness of the resin sheet at the point when a pair of split molds to be described is moved from an opened position to a closed position.

Figure 6:
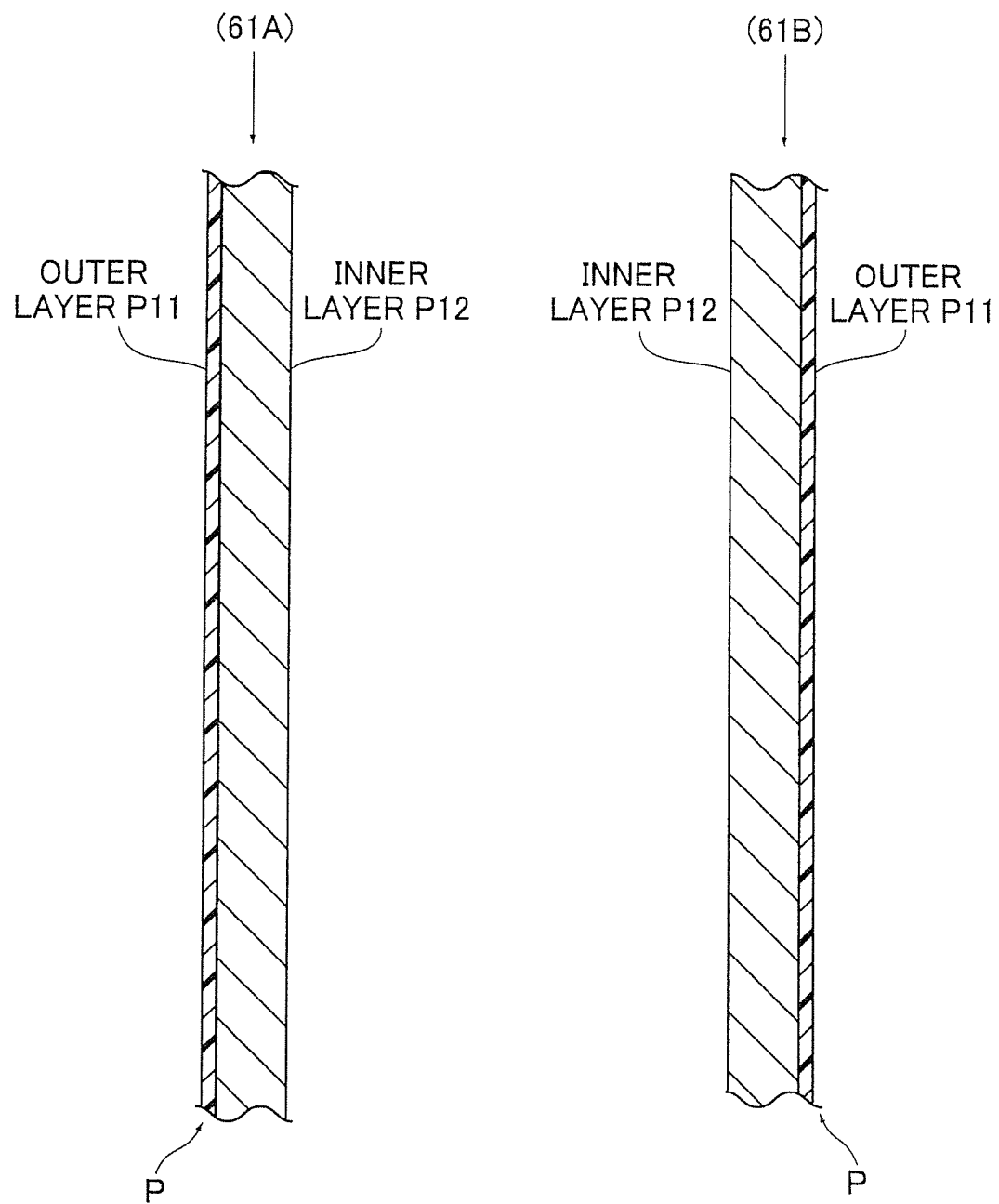
FIG. 6 is a fragmentary cross-sectional view of a multi-layered resin sheet to be extruded out of the T-die according to the first exemplary embodiment.

FIG. 6 illustrates cross-sections of multilayered resin sheets P to be extruded out of the T-dies 61A, 61B, respectively. As illustrated in FIG. 6, each of the multilayered resin sheets P is composed of an outer layer P11 and an inner layer P12. The outer layer P11 is made of a non-foamed resin in a molten state. The outer layer P11 is changed into the first resin sheet 11 after completion of the molding processing. On the other hand, the inner layer P12 is made of a foamed resin in a molten state. The inner layer P12 is changed into the second resin sheet 12 after completion of the molding processing. When the multilayered resin sheet P is herein extruded using the T-die 61A structured as exemplified in FIG. 5, for instance, molten resin is put into the flow path 81 of the T-die 61A whereas a molten resin, containing a foaming agent mixed therewith, is put into the flow path 83 of the T-die 61A. On the other hand, when the multilayered resin sheet P is extruded using the T-die 61B structured as exemplified in FIG. 5, a molten resin is put into the flow path 83 of the T-die 61B whereas a molten resin, containing a foaming agent is mixed therewith, is put into the flow path 81 of the T-die 61B.

If extruded as a single-layered sheet, the outer layer P11 made of a non-foamed resin, which is changed into the first resin sheet 11 after the molding processing, may be thinly formed to the extent that it cannot be stably extruded. According to the present exemplary embodiment, the outer and inner layers P11, P12 are extruded out of the multilayer T-die 61A (61B) while being unitarily laminated. The resin sheet P is thereby in a stable state as a whole. In other words, the extruded resin sheet P has an entirely sufficient thickness. This prevents the surface of the resin sheet P from being easily formed in a wavy shape after the resin sheet P is extruded. Further, the extruded resin sheet P has a large heat capacity. This prevents rapid reduction in temperature of the resin sheet P.

With reference to FIG. 3 again, the mold clamping device 54 includes a pair of split molds 71A, 71B. The pair of the split molds 71A, 71B is configured to be moved between an opened position and a closed position in a direction substantially perpendicular to a direction that the molten resin sheet P is supplied. The pair of the split molds 71A, 71B is disposed under a condition that the cavities 72A, 72B, respectively corresponding to them, are opposed to each other. Each of the cavities 72A, 72B can be provided with a convexo-concave portion on its surface. The convexo-concave portion is substantially matched with the outline of the sandwich panel 1.

In the split mold 71A (72B), pinch-off portions 74A (74B) are formed in the vicinity of the top and bottom ends of the corresponding cavity 72A (72B). The pinch-off portions 74A (74B) are protruded towards the opposed split mold 71B (71A) while being formed about the cavity 72A (72B) in an annular shape. With the structure, the tips of the pinch-off portions 74A and 74B are abutted to the molten resin sheets P when the pair of the split molds 71A, 71B is clamped. Accordingly, parting lines PL are formed on the peripheral edges of each molten resin sheet P.

In the split mold 71A (71B), a slider portion 75A (75B) is disposed in the circumferential part of the cavity 72A (72B). The slider portion 75A (75B) is allowed to be protruded from the cavity 72A (72B). The slider portion 75A (75B) is disposed for producing a sealed space between the corresponding resin sheet P and the split mold 71A (71B) with a configuration that the slider portion 75A (75B) is abutted to the resin sheet P at its end surface when being protruded from the cavity 72A (72B).

The split mold 71A (71B) houses a built-in vacuum chamber 73A (73B). The vacuum chamber 73A (73B) is connected to a vacuum pump and a vacuum tank (both of which are not illustrated in the figure). A communication path (not illustrated in the figure) is disposed between the vacuum chamber 73A (73B) and the cavity 72A (72B). The vacuum chamber 73A (73B) communicates with the cavity 72A (72B) through the communication path for vacuum suction.

The pair of the split molds 71A, 71B is driven by a mold driving device (not illustrated in the figure) and accordingly allowed to move between the opened position and the closed position. In the opened position, two consecutive molten resin sheets P are allowed to be disposed at a predetermined interval between the pair of the split molds 71A, 71B. In the closed position, on the other hand, the pinch-off portions 74A (74B) of the split mold 71A (71B) are abutted to the corresponding resin sheet P. A sealed space is accordingly produced within the split mold 71A (71B). It should be noted that the pair of the split molds 71A, 71B are respectively driven to move towards an imaginary center line between two molten resin sheets P when being moved from the opened position to the closed position.

Next, a method of molding the sandwich panel 1 will be hereinafter explained.

First, the multilayered resin sheet P in a molten state is extruded out of the die slits of the extruding device 52 in the vertical downward direction, as illustrated in FIG. 3. In the present exemplary embodiment, the resin sheet P is composed of two layers, i.e., the inner layer made of a foamed resin and the outer layer made of a non-foamed resin. Two extruded resin sheets P are respectively supplied to a space between the pair of the split molds 71A, 71B through the rollers 65A, 65B. At this time, the pair of the split molds 71A, 71B is disposed in the opened position.

When decoration sheets (e.g., fabric decoration sheets) are herein added to the surfaces of the sandwich panel 1, the outer layer of each hung-down resin sheet P and each decoration sheet can be respectively press-fitted by the rollers 65A (65B). It is herein preferable to form the inner surface of each decoration sheet in the form of cloth in order to enhance welding between each decoration sheet and each resin sheet P. Further, it is preferable to coat the surfaces of the respective rollers 65A, 65B with a thin fluorine film and heat the film at substantially 70-100 degrees Celsius for preventing attachment of the resin to the rollers 65A, 65B and for enhancing a welding strength.

Alternatively, the decoration sheets may be preliminarily disposed in the cavities of the split molds, and the outer layer of each resin sheet P may be welded with each decoration sheet at the timing of molding the resin sheets P.

It should be noted that an unwoven fabric is preferable as the fabric decoration sheet. It is especially preferable for enhancement in welding strength to use a needle-punched unwoven fabric formed by mechanically bonding fibers with barbed needles pierced into them.

Figure 7:
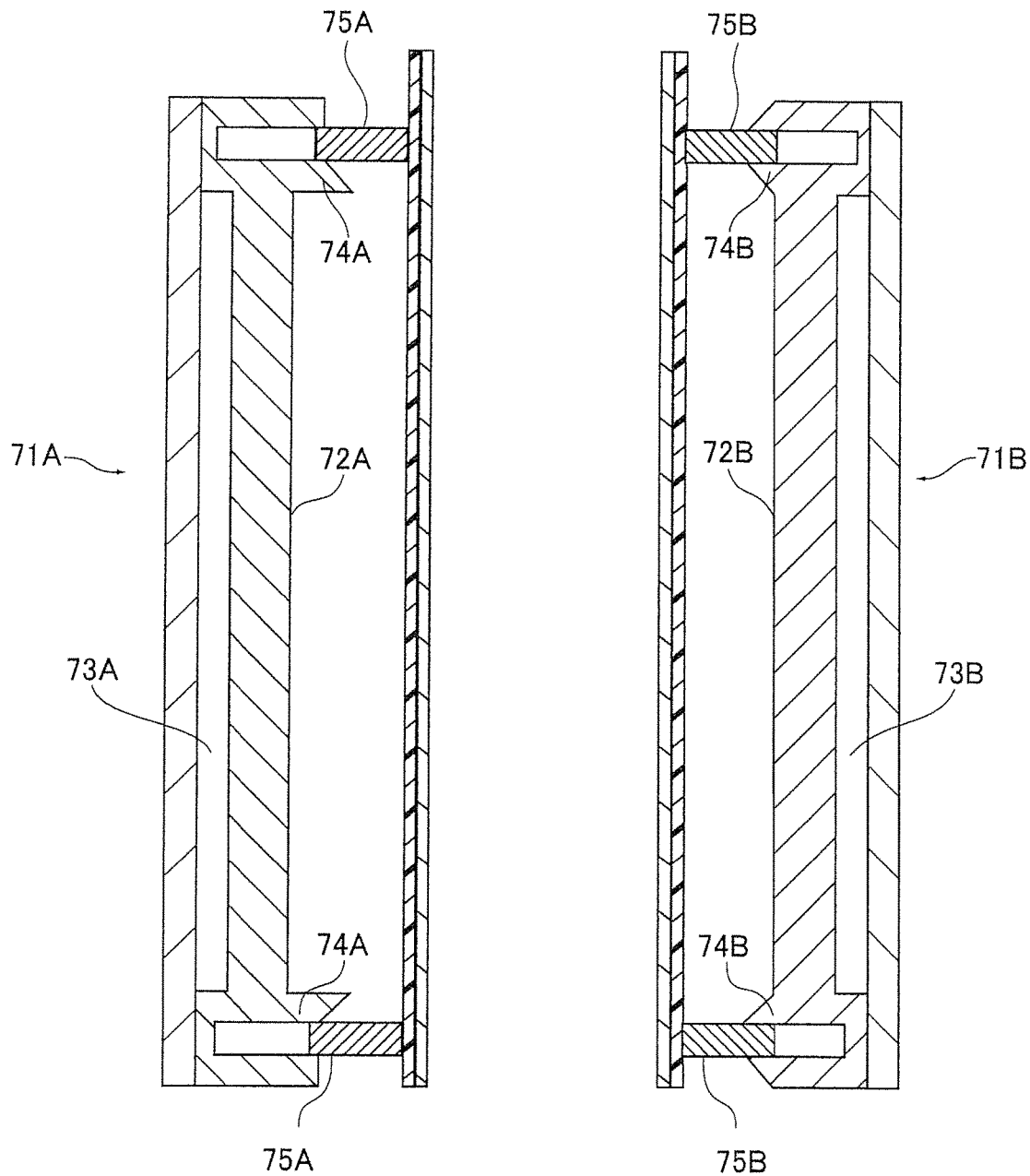
FIG. 7 is a diagram illustrating a condition that a sealed space is formed between each resin sheet and each cavity of the split molds in a method of molding the sandwich panel according to the first exemplary embodiment.
Figure 8:
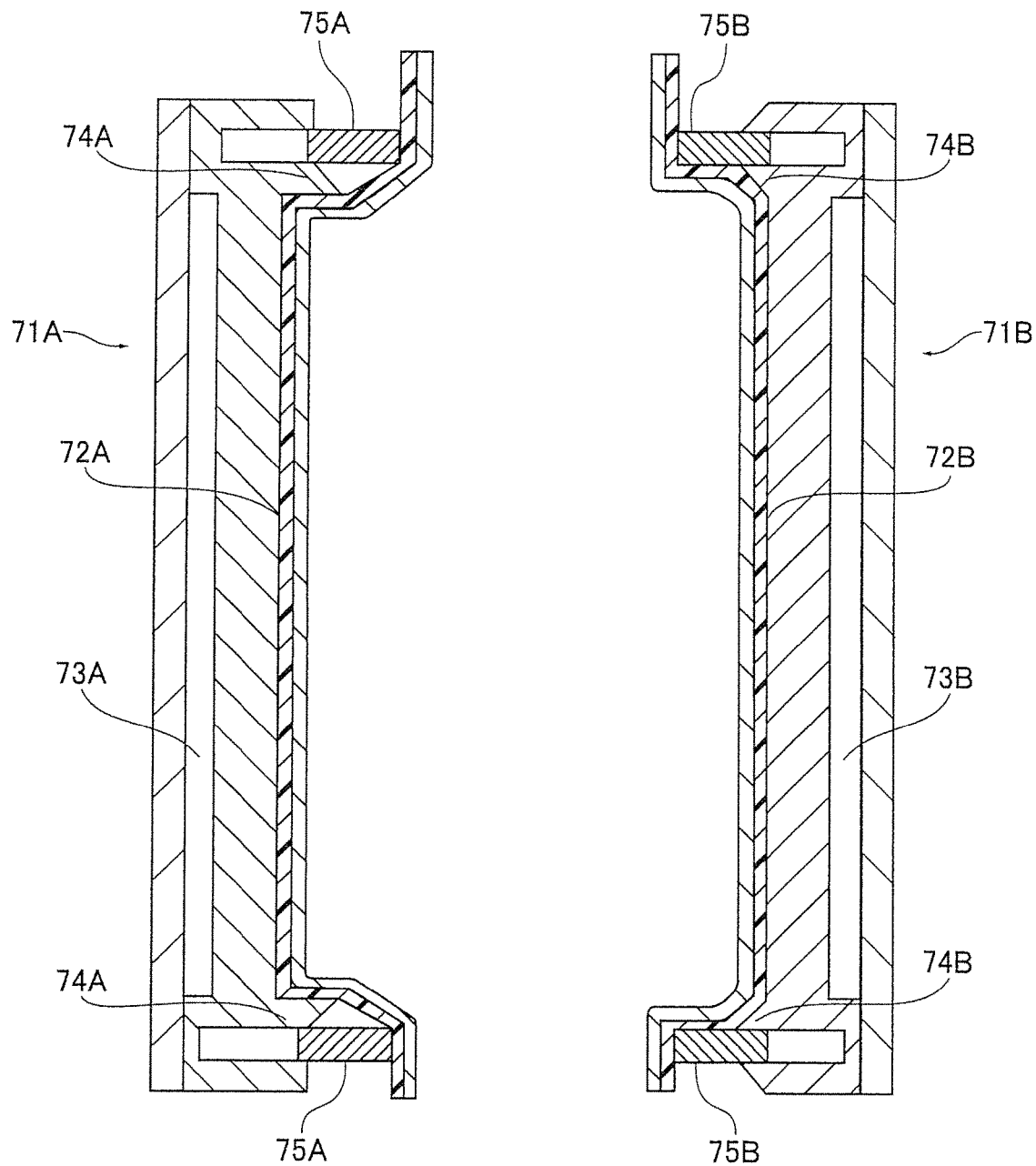
FIG. 8 is a diagram illustrating a condition that each resin sheet is formed along each cavity of the split molds in the method of molding the sandwich panel according to the first exemplary embodiment.

Next, the slider portion 75A (75B), disposed in the circumferential part of the cavity 72A (72B), is protruded to be abutted to the corresponding resin sheet P with its end surface, as illustrated in FIG. 7. Accordingly, a sealed space is formed between the resin sheet P and the cavity 72A (72B) of the split mold 71A (71B). Subsequently, air within the sealed space is sucked through the communication path (not illustrated in the figure) disposed between the vacuum chamber 73A (73B) and the cavity 72A (72B). As a result of suction, each of two resin sheets P is pressed onto the cavity 72A (72B) of the split mold 71A (71B). Accordingly, each of two resin sheets P is formed along the cavity 72A (72B), i.e., in a shape substantially identical to the outline of the sandwich panel 1, as illustrated in FIG. 8.

It should be noted that each of two resin sheets P can be reliably held while being abutted to the slider portion 75A (75B) with a configuration that air on the resin sheet P side is sucked through the tip of the slider portion 75A (75B) disposed in the circumferential part of the cavity 72A (72B). Further, it is possible to prevent formation of winkles on the resin sheets P when each of the resin sheets P is formed along the cavity 72A (72B) through suction of the sealed space.

Figure 9:
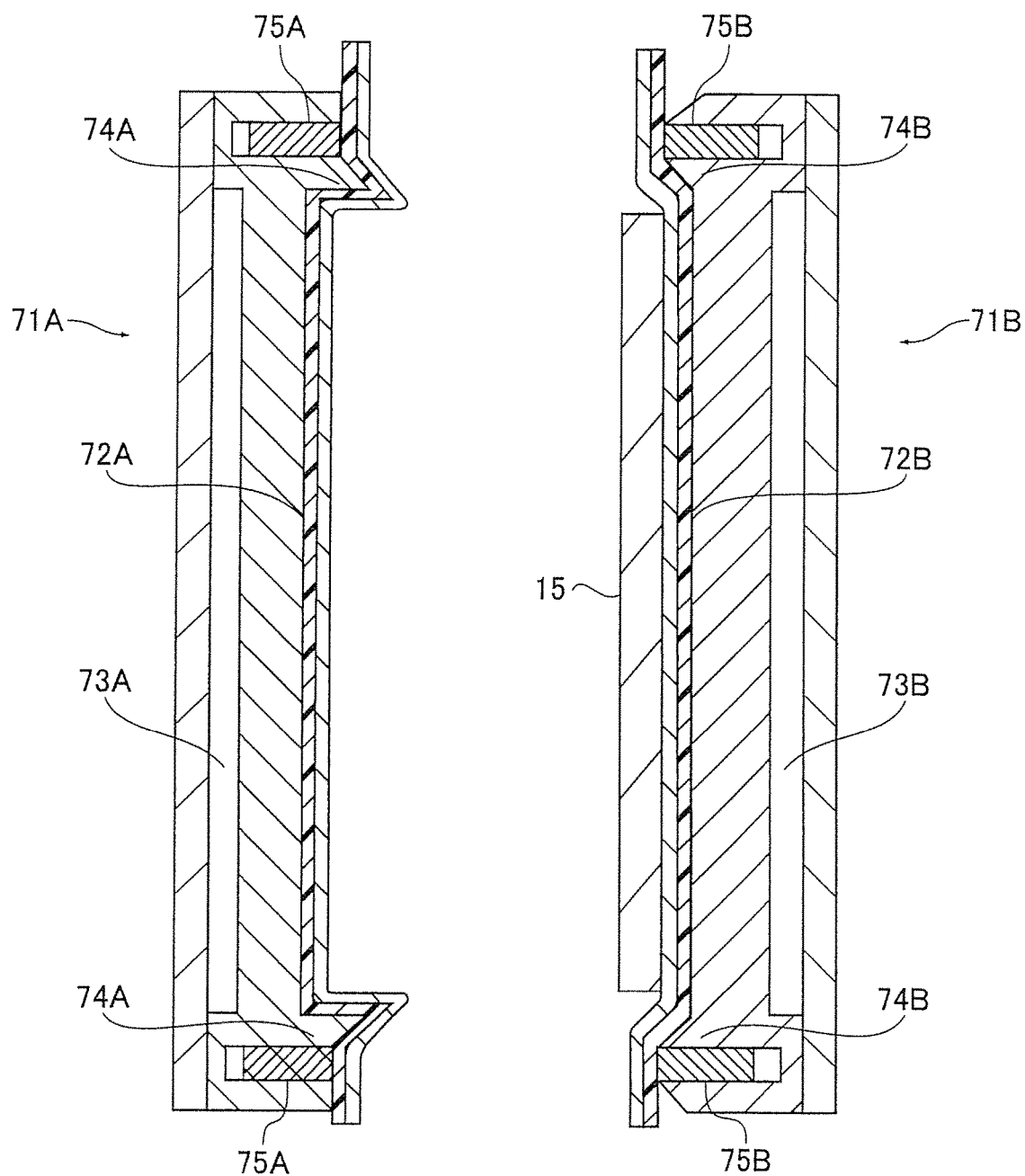
FIG. 9 is a diagram illustrating a condition that a core material is inserted into the split molds in the method of molding the sandwich panel according to the first exemplary embodiment.

Next, the core material 15 is appropriately positioned between the pair of the split molds 71A, 71B with a manipulator (not illustrated in the figure). As illustrated in FIG. 9, the core material 15 is then inserted from lateral into one of the pair of the split molds (the split mold 71B in an example of FIG. 9) while being pressed onto it. Accordingly, the core material 15 is welded with the resin sheet P. Although shrinkage of the resin sheets P obviously depend on resin materials forming them, the resin sheets P are normally shrunk at substantially 1% by a cooling processing after molding. The shape of the cavity 72A (72B) of the split mold 71A (71B) is designed in consideration of shrinkage of the resin sheet P. In other words, the cavity 72A (72B) is designed to be slightly larger than a target size of the resin sheet P after molding. This design allows the core material 15 at a room temperature to be loosely inserted into either of the split molds.

Figure 10:
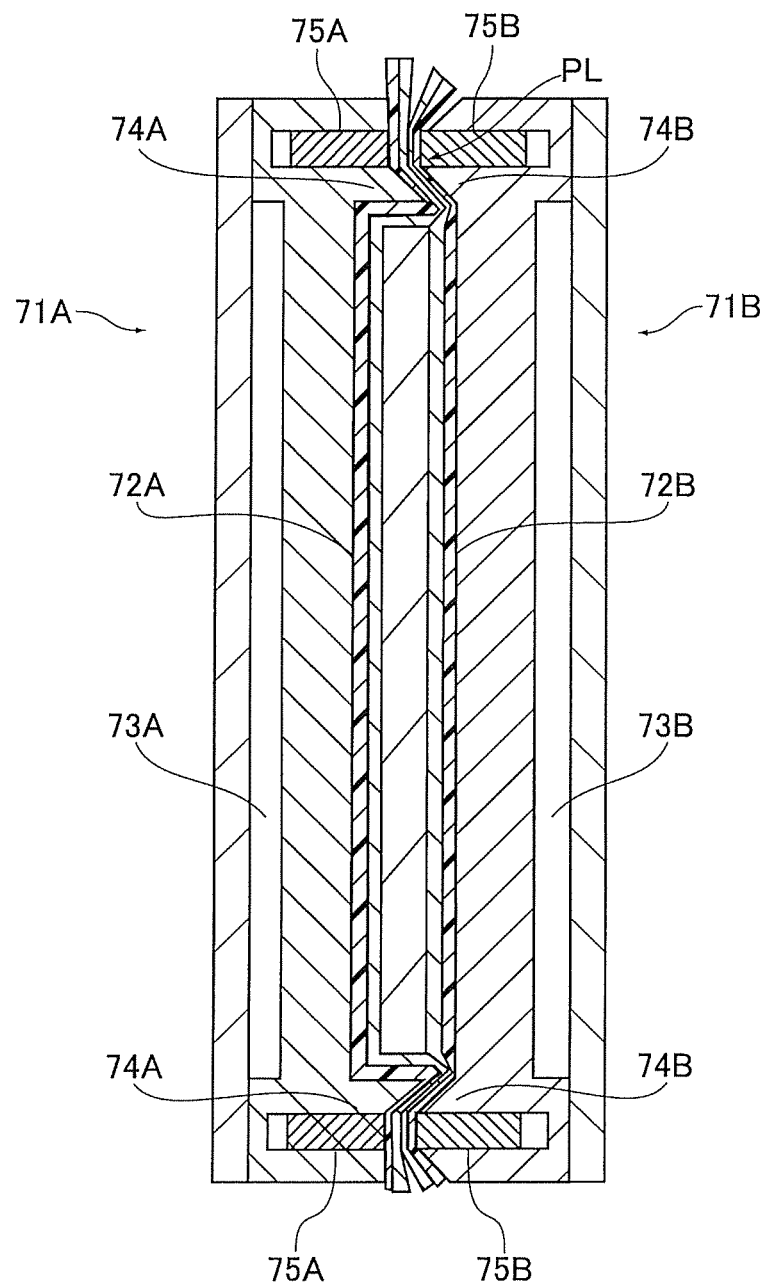
FIG. 10 is a diagram illustrating a condition that the split molds are moved to a closed position in the method of molding the sandwich panel according to the first exemplary embodiment.

Next, the pair of the split molds 71A, 71B is moved from the opened position to the closed position and is clamped therein, as illustrated in FIG. 10. Accordingly, the core material 15, welded with one of two resin sheets P (i.e., a right side sheet in the figure), is also welded to the other of two resin sheets P (i.e., a left side sheet in the figure). Further, a pair of the circumferential edges of each resin sheet P is welded in the positions of the pinch-off portions 74A (74B) of the split mold 71A (71B). Accordingly, the parting lines PL are formed thereon. It should be noted that the preliminarily molded core material 15 at a room temperature is welded to the molten resin sheets P in a mold clamping processing. Therefore, the core material 15 is appropriately positioned preliminarily for avoiding its deformation by the mold clamping processing.

Finally, the pair of the split molds 71A, 71B is again moved to the opened position. The sandwich panel 1 is accordingly moved away from the cavities 72A, 72B. Burrs, formed in the peripheries of the parting lines PL, are cut and removed with a tool such as a cutter. It should be noted that burrs may be configured to be cut by the pinch-off portions 74A, 74B simultaneously with the mold clamping processing. Consequently, the sandwich panel 1 is produced under a condition that the first resin sheet 11, the second resin sheet 12, the core material 15, the second resin sheet 12, and the first resin sheet 11 are sequentially laminated.

The aforementioned molding method enables molding of a thin non-foamed resin sheet (i.e., the first resin sheet 11) as a skin material sheet of the sandwich panel 1 of the present exemplary embodiment. Now, when a single-layered resin sheet, as a thin non-foamed resin sheet, is configured to be extruded as seen in the conventional methods, there are chances of causing the following drawback/drawbacks: a drawback that the resin sheet cannot be sufficiently welded with the core material because the resin sheet is rapidly cooled down and solidified immediately after being extruded; and/or a drawback that the surface of the resin sheet is formed in a wavy shape (i.e., a curtain phenomenon) because the resin sheet is thinly formed. Different from the conventional methods, the molding method of the present exemplary embodiment is configured to unitarily extrude plural layers forming a multilayered resin sheet in which a foamed molten resin (a molten resin to be changed into the second resin sheet 12) is added to a thin non-foamed molten resin. In other words, the thickness of the entire resin sheet is greater than that of a thin non-foamed molten resin layer. Therefore, it is possible to avoid the drawback that the surface of the resin sheet is formed in a wavy shape (i.e., a curtain phenomenon). Further, the heat capacity of the multilayered resin sheet of the present exemplary embodiment is greater than that of the single-layered resin sheet. After extruded out of the extruding device, the multilayered resin sheet reduces its temperature more gently than the single-layered resin sheet. In other words, the resin sheet is kept at a high temperature in the timing of inserting the core material into the split mold. Therefore, it is possible to avoid the drawback that the resin sheet cannot be sufficiently welded with the core material.

It should be noted that a glass filler may be mixed with the non-foamed resin forming the outer layer of the resin sheet in order to increase its stiffness and strength, as described above. In this case, a cooling speed immediately after extrusion is further increased than a case that a glass filler is not mixed with the non-foamed resin. Therefore, extrusion of a thin single-layered resin sheet will be further disadvantageous. According to the molding method of the present exemplary embodiment, on the other hand, plural layers of a thicker multilayered resin sheet are configured to be unitarily extruded. Therefore, the cooling speed immediately after extrusion of the multilayered resin sheet will be slower than that of the single-layered resin sheet even if a glass filler is mixed with the thin non-foamed resin sheet in the multilayered resin sheet.

It should be noted that a similar advantageous effect can be achieved even when another type of filler (e.g., an inorganic filler or a carbon filler) is mixed with the resin sheet instead of a glass filler.

As a conclusion, the method of molding a sandwich panel of the present exemplary embodiment is preferred for obtaining a thin non-foamed resin sheet having a higher stiffness.

As described above, molding cost can be reduced by the method of welding the extruded molten resin sheets with the core material under a condition that the resin sheets are held by the split molds before the resin sheets are solidified. The reason that molding cost can be reduced by the method is that the method is not required to have a reheating processing unlike a method of welding solidified resin sheets with a core material by reheating and melting the solidified resin sheets, for instance.

Further, it is possible to reduce an occupation area of a manufacturing device by configuring a molten resin sheet to be extruded in a vertical downward direction. This can be understood in contrast with, for instance, a case that a resin sheet is molded while being extruded in a horizontal direction. When a resin sheet is molded while being extruded in a horizontal direction, it is necessary to further provide a transportation device for horizontally moving the resin sheet. In addition, it is necessary to horizontally align the transportation device and the molds with the extruding device.

It should be noted that the aforementioned method of molding a sandwich panel of the present exemplary embodiment may be modified as needed. The following description relates to exemplary modifications of the method of molding a sandwich panel of the present exemplary embodiment.

(Exemplary Modification 1)

In the exemplified case of the aforementioned method of molding a sandwich panel, molten multilayered resin sheets are extruded out of a pair of T-dies. However, the multilayered sheets may be configured to be obtained by simultaneously cutting and extruding cylindrical multilayered parisons. The method of extruding multilayered resin sheets will be hereinafter explained with reference to FIGS. 11 and 12.

Figure 11A:
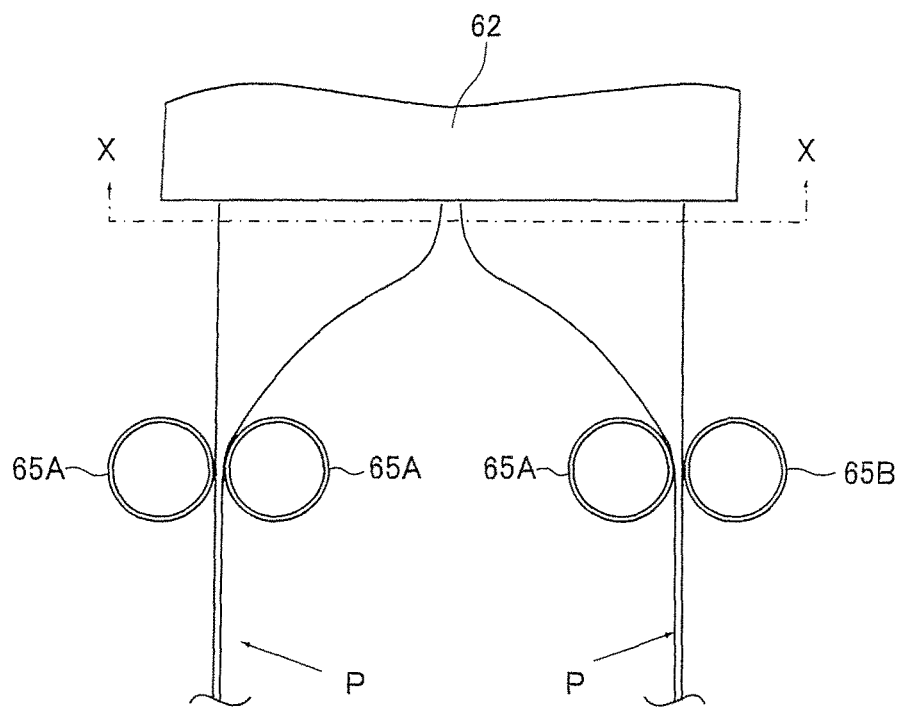
FIG. 11A is a diagram explaining an extruding device for simultaneously cutting and extruding a cylindrical multilayered parison in an exemplary modification of the first exemplary embodiment.
Figure 11B:
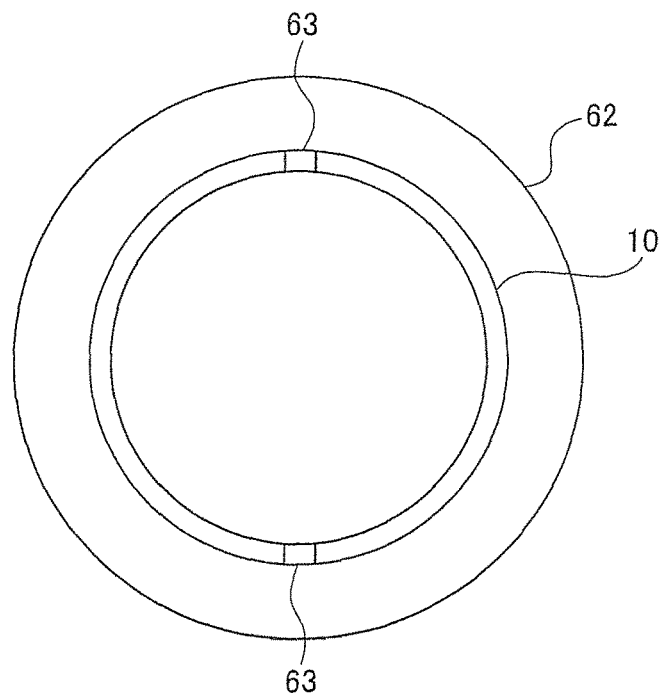
FIG. 11B is a cross-sectional view of the extruding device sectioned along a line X-X of FIG. 11A.
Figure 12:
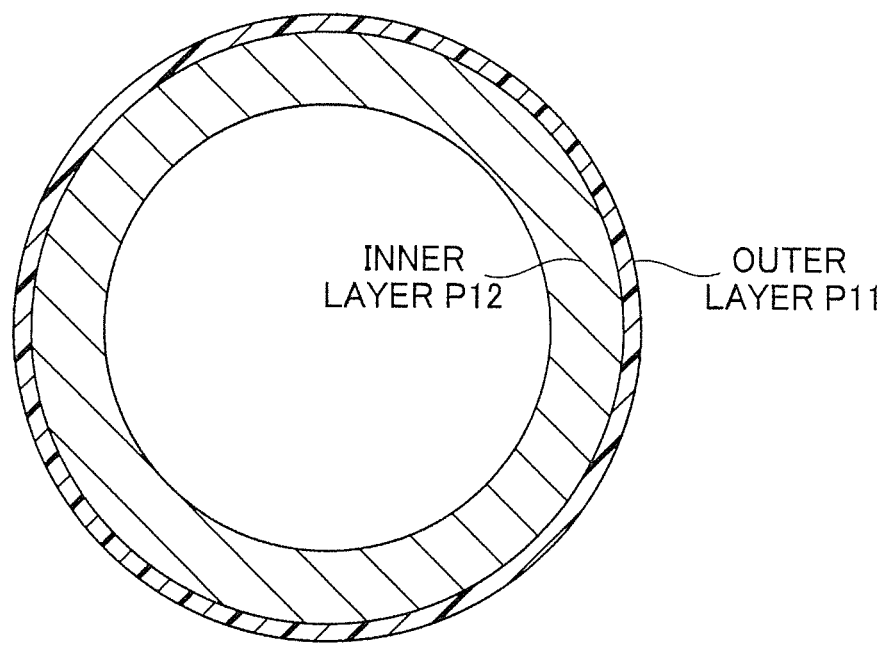
FIG. 12 is a diagram illustrating a cross-sectional shape of the cylindrical multilayered parison immediately before being cut in the exemplary modification of the first exemplary embodiment.

FIG. 11A is a fragmental side view of an extruding device 62 configured to simultaneously cut and extrude cylindrical multilayered parisons, whereas FIG. 11B is a cross-sectional view of the extruding device 62 sectioned along a line X-X. FIG. 12 is a diagram illustrating a cross-sectional shape of the cylindrical multilayered parison immediately before being cut.

In FIG. 11A, the extruding device 62 adopts the co-extrusion method. In the method, raw-material resins, respectively corresponding to layers of the multilayered sheet, are plasticized and molten with plural extruders and the molten resins are extruded while being unitarily laminated. Each of the extruders herein forms the molten resin in a cylindrical shape, and the molten resins are unitarily laminated while keeping their cylindrical shapes. For example, T-dies, structured similarly to the T-die illustrated in FIG. 5, may be used as the extruding device 62. In other words, the cylindrical multilayered parisons are formed with components (e.g., the flow paths and die lips) structured in an annular shape through a change or a modification of the T-die illustrated in FIG. 5. As illustrated in FIG. 12, the cylindrical multilayered parison is composed of an outer layer P11 and an inner layer P12. The outer layer P11 is made of a molten non-foamed resin and is changed into the first resin sheet 11 after molding. The inner layer P12 is made of a molten foamed resin and is changed into the second resin sheet 12 after molding.

As illustrated in FIG. 11B, in the extruding device 62, a pair of split members 63 is disposed on a flow path 10 into which the cylindrical parison is extruded. More specifically, the pair of the split members 63 is disposed on an axis rotated at substantially 90 degrees from an axis parallel to a direction that the split molds 71A, 71B are opposed. The cylindrical parison is split into two parts through the pair of the split members 63. As illustrated in FIG. 11A, the molten multilayered resin sheet P illustrated in FIG. 6 can be obtained by making the split parts of the cylindrical parison pass through the rollers 65A, 65B, respectively.

(Exemplary Modification 2)

In the exemplified case of the aforementioned method of molding a sandwich panel, the sealed spaces are produced between a resin sheet P and the cavity 72A of the split mold 71A and between another resin sheet P and the cavity 72B of the split mold 71B before the pair of the split molds 71A, 71B are moved to the closed position. However, a configuration of producing the sealed spaces is not necessarily limited to this. For example, the sealed spaces may be configured to be produced when the pair of the split molds 71A, 71B is moved to the closed position.

(Exemplary Modification 3)

In the exemplified case of the aforementioned method of molding a sandwich panel, air within the sealed spaces is configured to be sucked for pressing the resin sheets P onto the cavities 72A, 72B of the pair of the split molds 71A, 71B, respectively. However, a configuration of pressing the resin sheets P onto the cavities 72A, 72B is not necessarily limited to this. For example, the resin sheets P may be configured to be pressed onto the cavities 72A, 72B of the pair of the split molds 71A, 71B, respectively, by blowing fluid (e.g., air) towards the resin sheets P (i.e., blow molding).

(Exemplary Modification 4)

In the aforementioned method of molding a sandwich panel, a method of sucking air out of the sealed spaces or a method of blow molding is used for a processing step of respectively pressing the outer layers of the molten resin sheets onto the cavities of the split molds. However, the processing step is not necessarily executed by means of either of the methods. For example, the processing step may adopt a method of pressing the outer layers of the molten resin sheets onto the cavities of the split molds using the core material 15 without forming the sealed spaces. The method will be hereinafter explained with reference to FIGS. 13 and 14.

Figure 13:
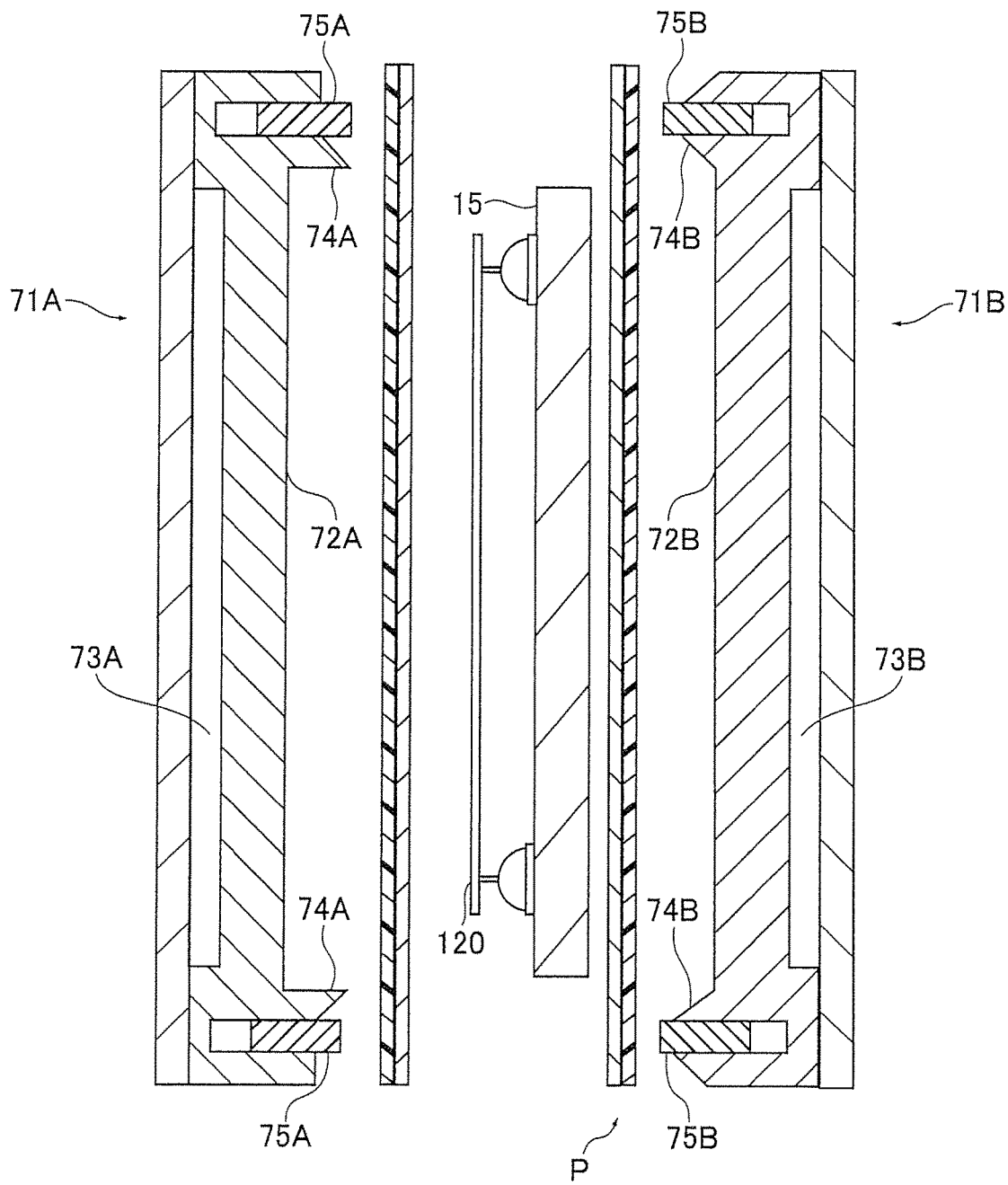
FIG. 13 is a diagram illustrating a condition before the core material is pressed onto either of the resin sheets in a molten state in another exemplary modification of the first exemplary embodiment.
Figure 14:
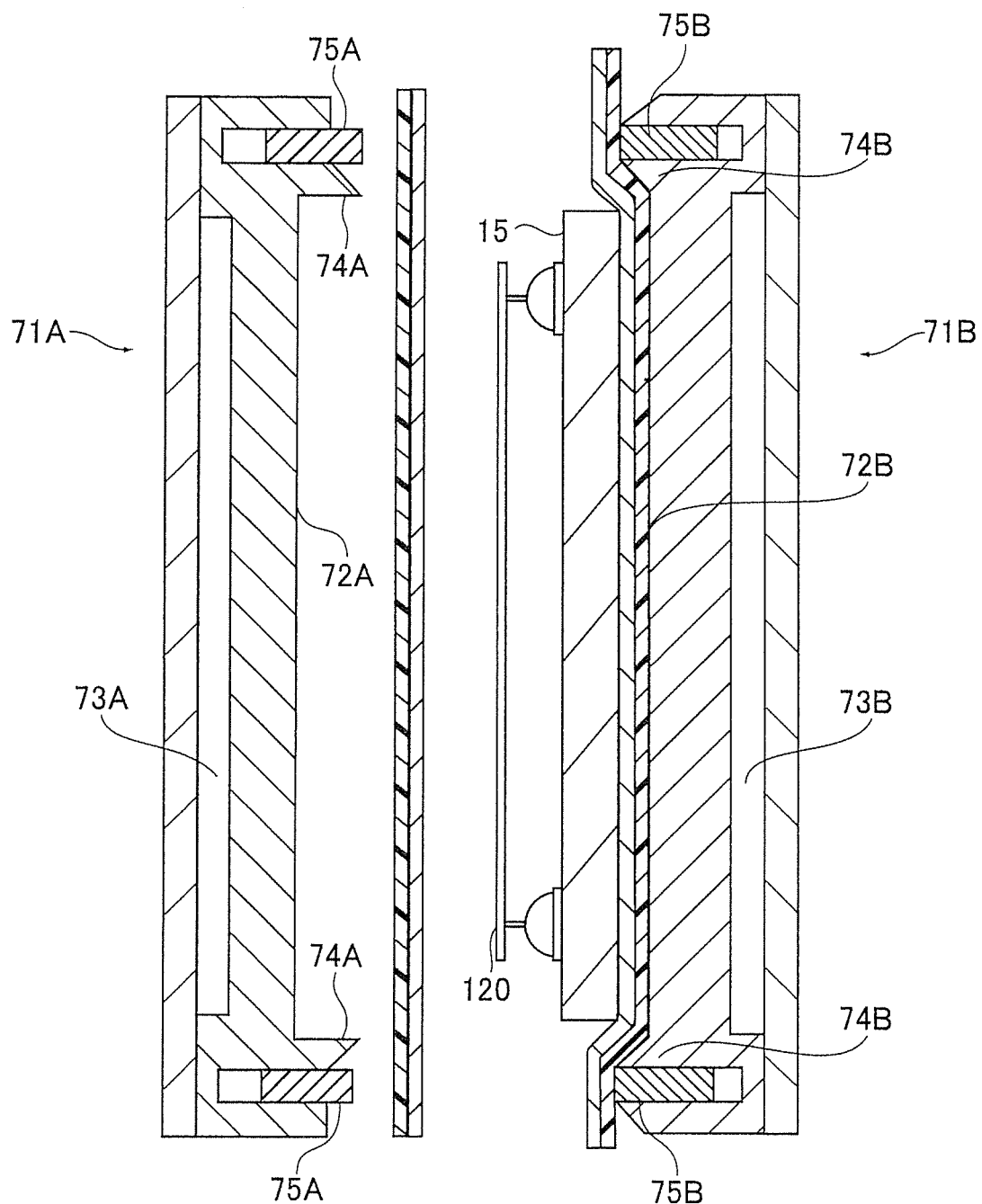
FIG. 14 is a diagram illustrating a condition after the core material is pressed onto either of the resin sheets in a molten state to the extent that the pressed resin sheet reaches the corresponding cavity of the split molds in another exemplary modification of the first exemplary embodiment.

FIG. 13 illustrates a condition before the core material 15 is pressed onto the molten resin sheet. On the other hand, FIG. 14 illustrates a condition after the core material 15 is pressed onto the molten resin sheet to the extent that the core material 15 reaches the cavity of the split mold.

In the method of the present exemplary modification, as illustrated in FIG. 13, the core material 15, held by a manipulator 120, is appropriately disposed in a position where it is opposed to the split mold 71B through one of the molten multilayered resin sheets P under a condition that the molten multilayered resin sheets P are extruded out of the extruding device 52 in the vertical downward direction (i.e., a condition identical to that illustrated in FIG. 3). In response to the appropriate positioning of the core material 15, the manipulator 120 is moved towards the cavity 72B of the split mold 71B while holding the core material 15. Accordingly, the core material 15 is abutted to the molten resin sheet P, and the core material 15 and the resin sheet P are welded. When abutted to the core material 15, the molten resin sheet P is kept at a relatively high temperature because it does not make contact with the split mold 71B having a high heat conductivity. Therefore, the core material 15 and the resin sheet P are welded in a good condition. A state illustrated in FIG. 14 is produced when the manipulator 120 is further moved and the outer layer of the resin sheet P reaches the cavity 72B of the split mold 71B. The manipulator 120 herein presses the outer layer of the resin sheet P onto the cavity 72B through the core material 15. Subsequently, the manipulator 120 is detached from the core material 15.

The subsequent processing steps are executed as described above. Specifically, the pair of the split molds 71A, 71B is moved from the opened position to the closed position and clamped therein, as illustrated in FIG. 10. Accordingly, the core material 15, having welded to one of the pair of the resin sheets P (i.e., the right side sheet in the figure), is further welded to the other of the pair of the resin sheets P (i.e., the left side sheet in the figure). Then, the pair of the resin sheets P is respectively pressed onto the cavities 72A, 72B of the split molds 71A, 71B. The pair of the resin sheets P is accordingly formed along the cavities 72A, 72B. In other words, the pair of the resin sheets P is formed in a shape substantially the same as the outline of the sandwich panel 1, as illustrated in FIG. 8. Further, a pair of the circumferential edges of each resin sheet P is welded in the positions of the pinch-off portions 74A (74B) of the split mold 71A (71B). Accordingly, the parting lines PL are formed thereon. Finally, the pair of the split molds 71A, 71B is moved again to the opened position, and the molded sandwich panel 1 is moved away from the cavities 72A, 72b. Further, burrs formed in the periphery of the parting lines PL are cut and removed by means of a tool such as a cutter. Thus, the sandwich panel 1 is completely formed in a condition that the first resin sheet 11, the second resin sheet 12, the core material 15, the second resin sheet 12, and the first resin sheet 11 are sequentially laminated.

As described above, a method of pressing the molten resin sheet onto the cavity of the split mold using the core material 15 can be applied as the processing step of pressing the outer layer of the molten resin sheet onto the cavity of the split mold. The following differences can be found when the processing step of pressing the molten resin sheet onto the cavity of the mold and the method of sucking air out of the sealed space. First, according to the method of pressing the resin sheet onto the cavity of the split mold using the core material 15, the molten resin sheet P does not make contact with the split mold having a high heat conductivity when it makes contact with the core material 15. In other words, the resin sheet P keeps a relatively high temperature. The resin sheet P is thereby welded with the core material 15 in a good condition.

The method of sucking air out of the sealed space is superior to the method of pressing the resin sheet onto the cavity of the split mold using the core material 15 in terms of a transfer performance of the resin sheet with respect to the cavity of the split mold. In spite of the advantage, the method of sucking air out of the sealed space tends to cause the following disadvantage. The resin sheet reduces its temperature and is hardened by the contact with the split mold whose heat conductivity is high in transference of the resin sheet. In general, the welding strength of the resin sheet with the core material 15 is subsequently reduced. According to the present exemplary embodiment, however, a foamed resin is used as the inner layer of the resin sheet. Therefore, it is possible to inhibit the aforementioned reduction in welding strength. It can be concluded that the molding method of the present exemplary embodiment achieves both a high transfer performance and a required welding strength in the processing step of pressing the outer layer of the molten resin sheet onto the cavity of the split mold due to the method of sucking air out of the sealed space in cooperation with the use of the foamed resin as the inner layer of the resin sheet.

Second Exemplary Embodiment

A single-side skinned panel and a molding method thereof will be hereinafter explained as a skinned panel according to a second exemplary embodiment of the present invention. The single-side skinned panel is a skinned panel in which only one side of the core material is covered with a skin material sheet. In the present exemplary embodiment, the term "single-side skinned panel" is hereinafter simply referred to as "a skinned panel".

The skinned panel of the present exemplary embodiment is different from the sandwich panel 1 of the first exemplary embodiment in that the first resin sheet 11 and the second resin sheet 12 are formed only on a side of the core material 15. The first and second resin sheets 11, 12 in the sandwich panel 1 are applicable to those in the skinned panel of the present exemplary embodiment. Therefore, description of the first and second resin sheets 11, 12 will be hereinafter omitted for the sake of brevity.

Next, a method of molding a skinned panel of the present exemplary embodiment will be hereinafter explained. In the present exemplary embodiment, the skinned panel is configured to be molded using the molding apparatus 50 illustrated in FIG. 3. The method of molding a skinned panel will be hereinafter explained, focusing on its differences from the method of molding the sandwich panel 1 of the first exemplary embodiment.

First, a molten multilayered resin sheet P is extruded out of die slits of the extruding device 52 in the vertical downward direction. The processing step of extruding the multilayered resin sheet of the present exemplary embodiment is different from that illustrated in FIG. 3 in that the resin sheet P is extruded from only one of the T-dies 61A, 61B of the extruding device 52. For the sake of convenience in explanation, the molten resin sheet P is herein assumed to be extruded out of the T-die 61B. It should be noted that the resin sheet P to be extruded is the same as that described in the first exemplary embodiment, i.e., a multilayered resin sheet composed of two layers: an inner layer made of a foamed resin; and an outer layer made of a non-foamed resin. The extruded multilayered resin sheet P in a molten state is supplied through rollers 65B to a place between the pair of the split molds 71A, 71B set to be in the opened position.

Next, a slider portion 75B, disposed in the circumferential part of the cavity 72B, is protruded to make contact with the resin sheet P with its end surface (see the right side in FIG. 7). Accordingly, a sealed space is formed between the resin sheet P and the cavity 72B of the split mold 71B. Different from the case of the first exemplary embodiment, a slider portion 75A, disposed in the circumferential part of the cavity 72A, is not required to be protruded because a resin sheet to be extruded out of the T-die 61A does not exist. Under a condition that the sealed space is produced, air within the sealed space is then sucked through a communication path (not illustrated in the figure) disposed between a vacuum chamber 73B and the cavity 72B. The resin sheet P is pressed onto the cavity 72B of the split mold 71B in response to the suction. Consequently, the resin sheet P is formed along the cavity 72B. In other words, the resin sheet P is formed in a shape substantially the same as the outline of the skinned panel of the present exemplary embodiment. A right side diagram in FIG. 8 illustrates a condition that the resin sheet is formed.

Figure 15:
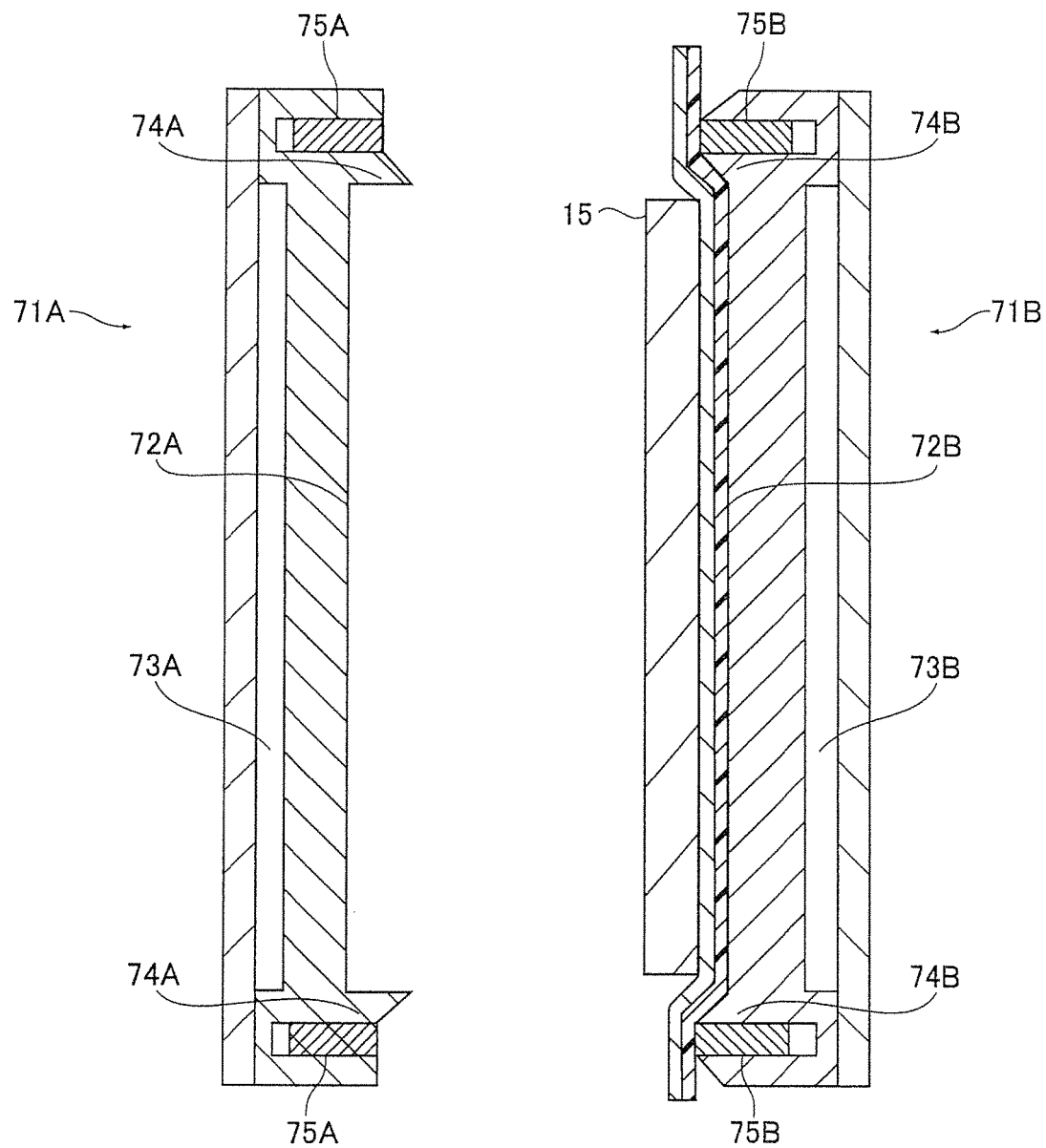
FIG. 15 is a diagram illustrating a condition that the core material is inserted into the split molds in a method of molding the sandwich panel according to a second exemplary embodiment.

Next, the core material 15 is appropriately positioned between the pair of the split molds 71A, 71B using a manipulator (not illustrated in the figure). The core material 15 is then inserted into the place from lateral while being pressed onto the split mold 71B. Accordingly, the core material 15 is welded with the resin sheet P. FIG. 15 illustrates a condition that the core material 15 is welded with the resin sheet P in the present exemplary embodiment.

Figure 16:
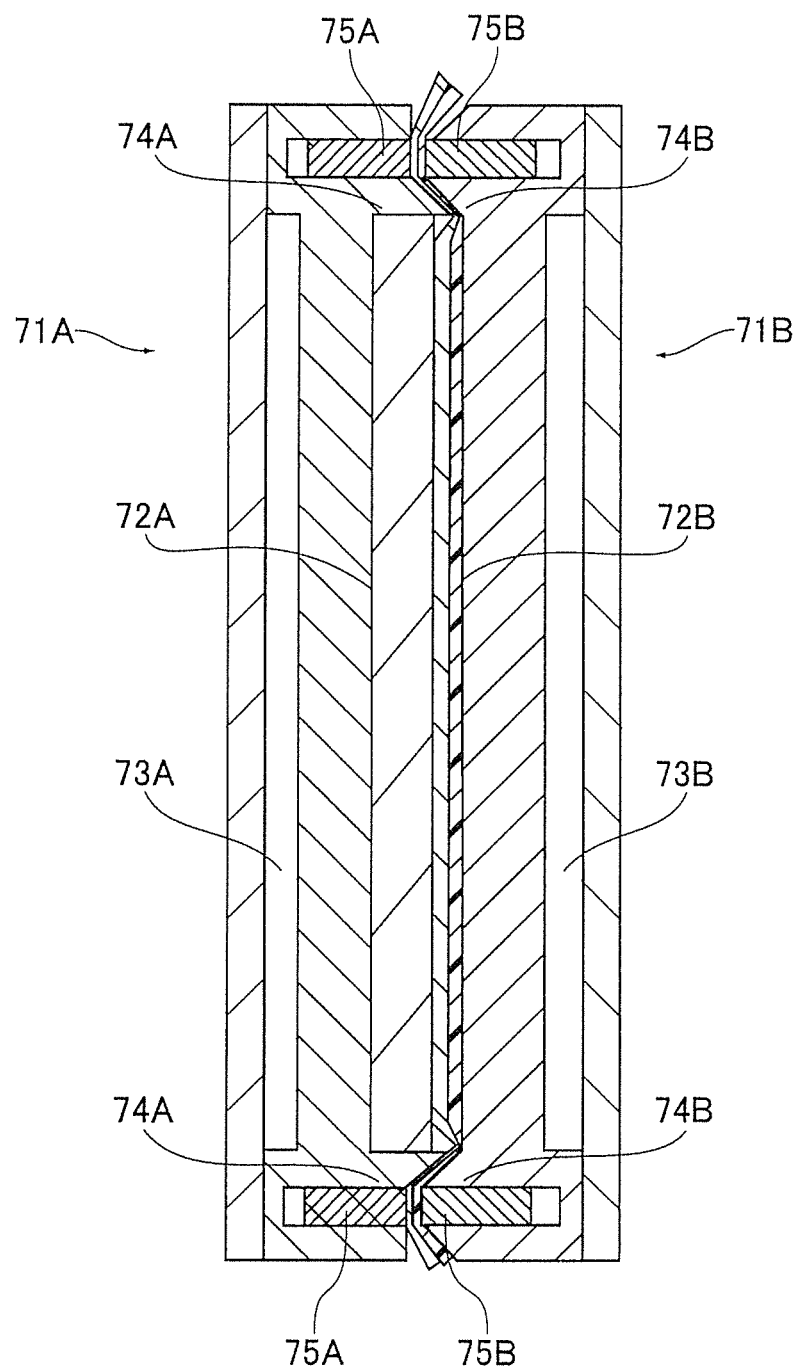
FIG. 16 is a diagram illustrating a condition that the split molds are moved to a closed position in the method of molding the sandwich panel according to the second exemplary embodiment.

Further, the pair of the split molds 71A, 71B is moved from the opened position to the closed position and clamped therein, as illustrated in FIG. 16. Accordingly, the parting lines PL are formed on the circumferential edges of the resin sheet P in the positions of the pinch-off portions 74A, 74B of the pair of the split molds 71A, 71B. It should be noted that the preliminarily-molded core material 15 kept in a room temperature is welded to the molten resin sheet P in a mold clamping processing and the core material 15 is thereby appropriately positioned preliminarily for preventing its deformation by the mold clamping processing. The configuration is the same as that of the first exemplary embodiment.

Finally, the pair of the split molds 71A, 71B is moved again to the opened position, and the molded skinned panel is moved away from the cavities 72A, 72B. Further, burrs formed in the periphery of the parting lines PL are cut and removed by means of a tool such as a cutter. It should be noted that burrs may be configured to be cut by the pinch-off portions 74A, 74*b* simultaneously with the mold clamping processing. Thus, the single-side skinned panel is completely formed in a state that the first resin sheet 11 and the second resin sheet 12 are laminated on the core material 15.

A thin non-foamed resin sheet (the first resin sheet 11) can be molded as a skin material sheet of the single-side skinned panel of the present exemplary embodiment with the aforementioned molding method. Layers of the multilayered resin sheet are configured to be unitarily extruded in the molding method of the present exemplary embodiment as seen in the molding method of the first exemplary embodiment. Therefore, the following drawbacks can be avoided: a drawback that the surface of the resin sheet is formed in a wavy shape (i.e., a curtain phenomenon); and a drawback that the resin sheet cannot be sufficiently welded with the core material.

It is possible to apply the contents of the aforementioned molding methods according to the exemplary modifications of the first exemplary embodiment to the present exemplary embodiment. For example, the present exemplary embodiment can adopt a method of pressing the outer layer of the molten resin sheet onto the cavity of the split mold using the core material 15 without forming the sealed space as described in the molding method according to the exemplary modification 4 of the first exemplary embodiment. In this case, the molding method of the present exemplary embodiment is not required to use the split molds. In other words, the split molds are not necessarily required for molding the single-side skinned panel of the present exemplary embodiment as long as the resin sheet is pressed onto one side of the core material 15, although the molding method using the pair of the split molds 71A, 71B has been explained for the sake of convenience in the aforementioned second exemplary embodiment. When a target shape of the resin sheet is a flat shape, for instance, the present exemplary embodiment can adopt a method of pressing the outer layer of the molten resin sheet onto a flat plat made of metal (not illustrated in the figure) disposed in the same position as the aforementioned split mold 71B using the core material 15.

The exemplary embodiments of the present invention have been explained above in detail. However, the skinned panel and the molding method thereof are not necessarily limited to the aforementioned exemplary embodiments. Various changes and modifications can be obviously made for them without departing the scope of the present invention. For example, the double-layered resin sheet P has been exemplified in the aforementioned exemplary embodiments. However, it is apparent for those skilled in the art that the present invention can be applied to a multilayered resin sheet composed of three or more layers. For example, the present invention can be applied to a triple-layered resin sheet that a foamed layer is laminated on the outside of a non-foamed layer configured as the outermost layer in the aforementioned exemplary embodiments (i.e., a multilayered resin sheet composed of a foamed layer, a non-foamed layer, and a foamed layer laminated in this order from the outside) or a triple-layered resin sheet composed of plural layers laminated in the following order from the outside: a non-foamed layer; a first foamed layer; and a second foamed layer containing an element different from that contained in the first foamed layer. Further, in the aforementioned exemplary embodiments, the cases have been exemplified that the sealed space has been produced between the resin sheet P and the cavity 72A (72B) of the split mold 71A (71B). However, the space to be herein produced is not necessarily limited to the sealed space. In other words, it is possible to suck air from the space even if the space includes a certain extent of clearance. Further, the split molds are not necessarily moved to the closed position after the core material is welded with one of the resin sheets as described above. Alternatively, the molds may be moved to the closed position while the core material is disposed in the middle position between a pair of the resin sheets and the core material may be welded with the pair of the resin sheets. For example, the core material may be disposed in the middle position between the pair of the resin sheets while being hung down.

All examples and conditional language used herein are intended for explanatory purposes to aid the readers in understanding the invention and the concepts contributed by the inventor to furthering the art, and are not to be construed as limiting the scope of the invention to such specifically described examples and conditions, nor does the organization of such examples in the specification relate to a showing of the superiority and inferiority of the invention. Although the embodiment(s) of the present invention have been described in detail, it should be understood that various changes, substitutions, and alternations could be made hereto without departing from the spirit and scope of the invention.

What is claimed is:

1. A method of molding a skinned panel whose core material is covered with a skin material sheet, comprising the steps of:

extruding first and second multilayered molten resin sheets at a speed of greater than or equal to 60 kg/h per 1 $cm^2$ from an accumulator of an extruding device, each of the first and second multilayered molten resin sheets including an inner layer made of a foamed resin and an outer layer made of a non-foamed resin laminated together, and providing causing the first and second multilayered molten resin sheets to hang vertically downward within a space defined between first and second split molds that are opposed to each other in an open position, the inner layer having a thickness that is 1.0 mm, the inner layer being foamed using a physical foaming agent which is nitrogen gas, the inner layer having an expansion ratio ranging from 2.5 to 10, the non-foamed resin of the outer layer being extruded together with a filler material containing at least any one of glass filler, inorganic filler and carbon fiber and the outer layer having a thickness that ranges from 0.1 mm to 0.6 mm, the outer layer and the inner layer including a material in which polystyrene with a weight percent of 20-33 and styrene-ethylene-butylene-styrene with a weight percent of 5-7 are mixed into polypropylene with a weight percent of 60-75, a core material having a first solubility parameter and the inner layer having a second solubility parameter, with a difference between the first solubility parameter and the second solubility parameter being 2.0 $cal/cm^3$ or less;

press-fitting the outer layers of the first and second multilayered molten resin sheets and decoration sheets by rollers each coated with a fluorine film and heated at 70-100 degrees Celsius, respectively;

welding the inner layer of the first multilayered molten resin sheet to a first side of the core material before the first multilayered molten resin sheet contacts a cavity of the first split mold and pressing the first multilayered molten resin sheet to a cavity of the first split mold by use of the core material, wherein the core material is made of a foamed polystyrene;

vacuum pressing the second multilayered molten resin sheet to cavity of the second split mold;

welding the inner layer of the second multilayered molten resin sheet to a second side of the core material by moving the first and second split molds to a closed position; and welding a pair of circumferential edges of the first multilayered molten resin sheet and the second multilayered molten resin sheet at pinch-off portions of the first split mold and the second split mold by horizontally moving the first and second split molds to the closed position, thereby forming parting lines, wherein the step of extruding each of first and second multilayered molten resin sheets is executed by extruding the foamed resin material to be used as the inner layer of the molten resin sheet and the non-foamed resin material to be used as the outer layer of the molten resin sheet in a laminated state by means of a T-die co-extrusion method, the outer layer and the inner layer of each of the first multilayered molten resin sheet and the second multilayered molten resin sheet are joined and laminated in a position close to a die tip of the T-die, and the T-die applies a multi-manifold method having first and second manifolds, the first manifold has a first choke bar to regulate a flow rate of the foamed resin, and the second manifold has a second choke bar to regulate a flow rate of the non-foamed resin, wherein a first slider portion is disposed for horizontal movement in a circumferential part of the cavity of the first split mold in the vacuum pressing with a tip of the first slider portion to horizontally abut on the first multilayered molten resin sheet to produce producing a sealed space between the first multilayered molten resin sheet and the cavity of the first split mold, and a second slider portion is disposed for horizontal movement in a circumferential part of the cavity of the second split mold in the vacuum pressing with a tip of the second slider portion to horizontally abut on the second multilayered molten resin sheet to produce producing a sealed space between the second multilayered molten resin sheet and the cavity of the second split mold, wherein in the vacuum pressing, air on the first multilayered molten resin sheet side is sucked through the tip of the first slider portion, and air on the second molten multilayered molten resin sheet side is sucked through the tip of the second slider portion, and wherein after the extruding of the first and the second multilayered molten resin sheets, the first and second multilayered molten resin sheets are not heated.

\* \* \* \* \*